Figure 1:
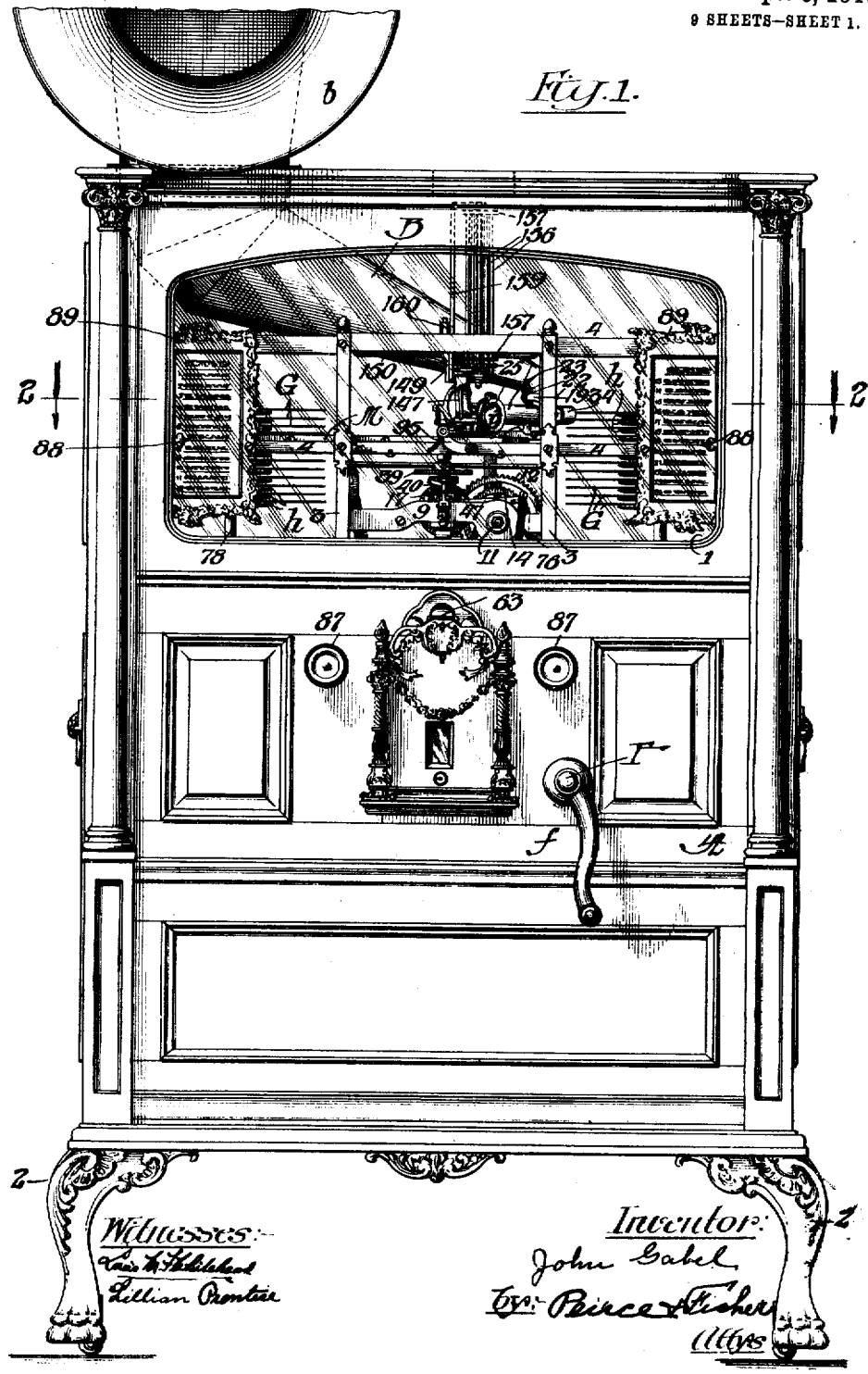

J. GABEL.
AUTOMATIC TALKING MACHINE.
APPLICATION FILED FEB. 26, 1906.

1,134,603.

Patented Apr. 6, 1915.
9 SHEETS—SHEET 1.

J. GABEL.
AUTOMATIC TALKING MACHINE.
APPLICATION FILED FEB. 26, 1906.
1,134,603.
Patented Apr. 6, 1915.
9 SHEETS—SHEET 2.
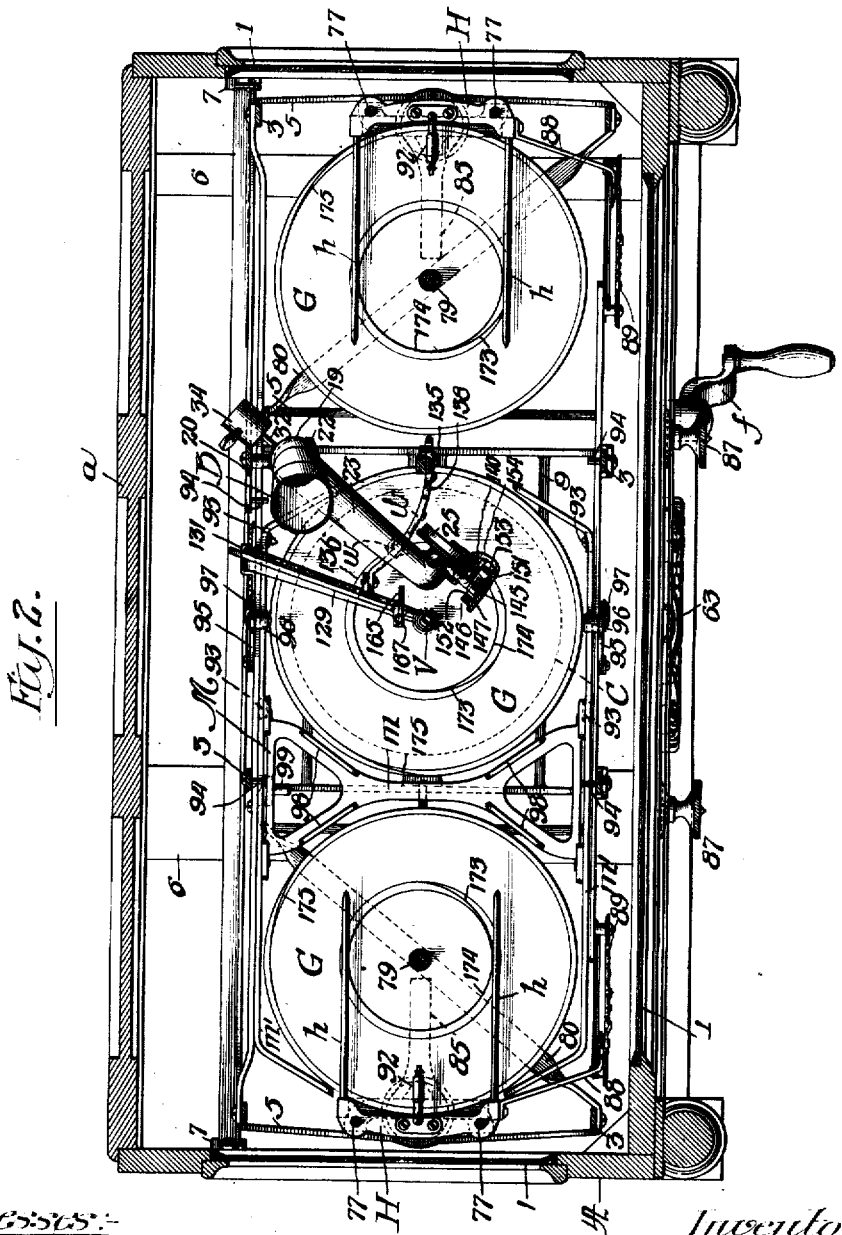

J. GABEL.
AUTOMATIC TALKING MACHINE.
APPLICATION FILED FEB. 26, 1906.
1,134,603.
Patented Apr. 6, 1915.
9 SHEETS—SHEET 8.
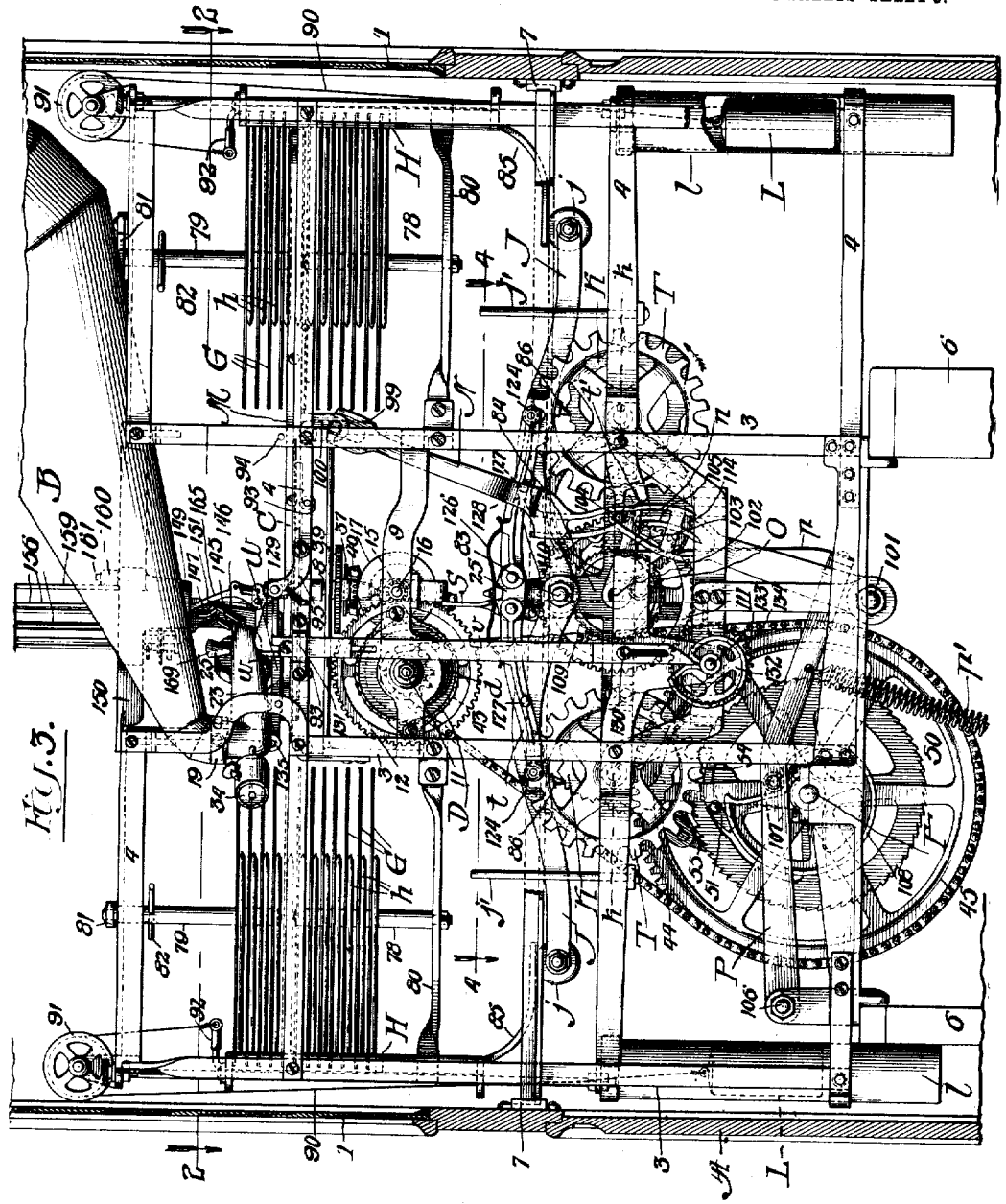

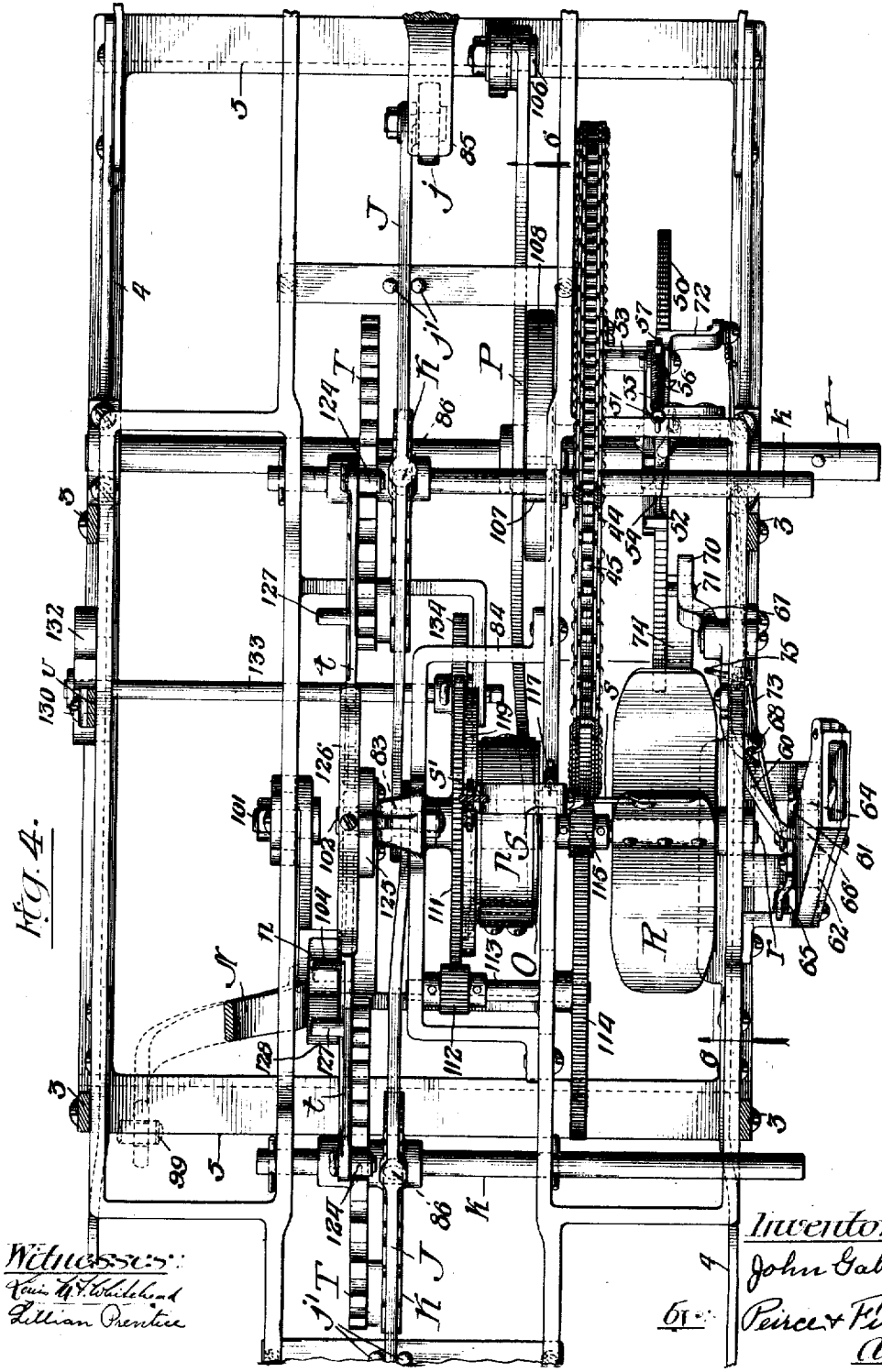

J. GABEL.
AUTOMATIC TALKING MACHINE.
APPLICATION FILED FEB. 26, 1906.
1,134,603.
Patented Apr. 6, 1915.
9 SHEETS—SHEET 5.
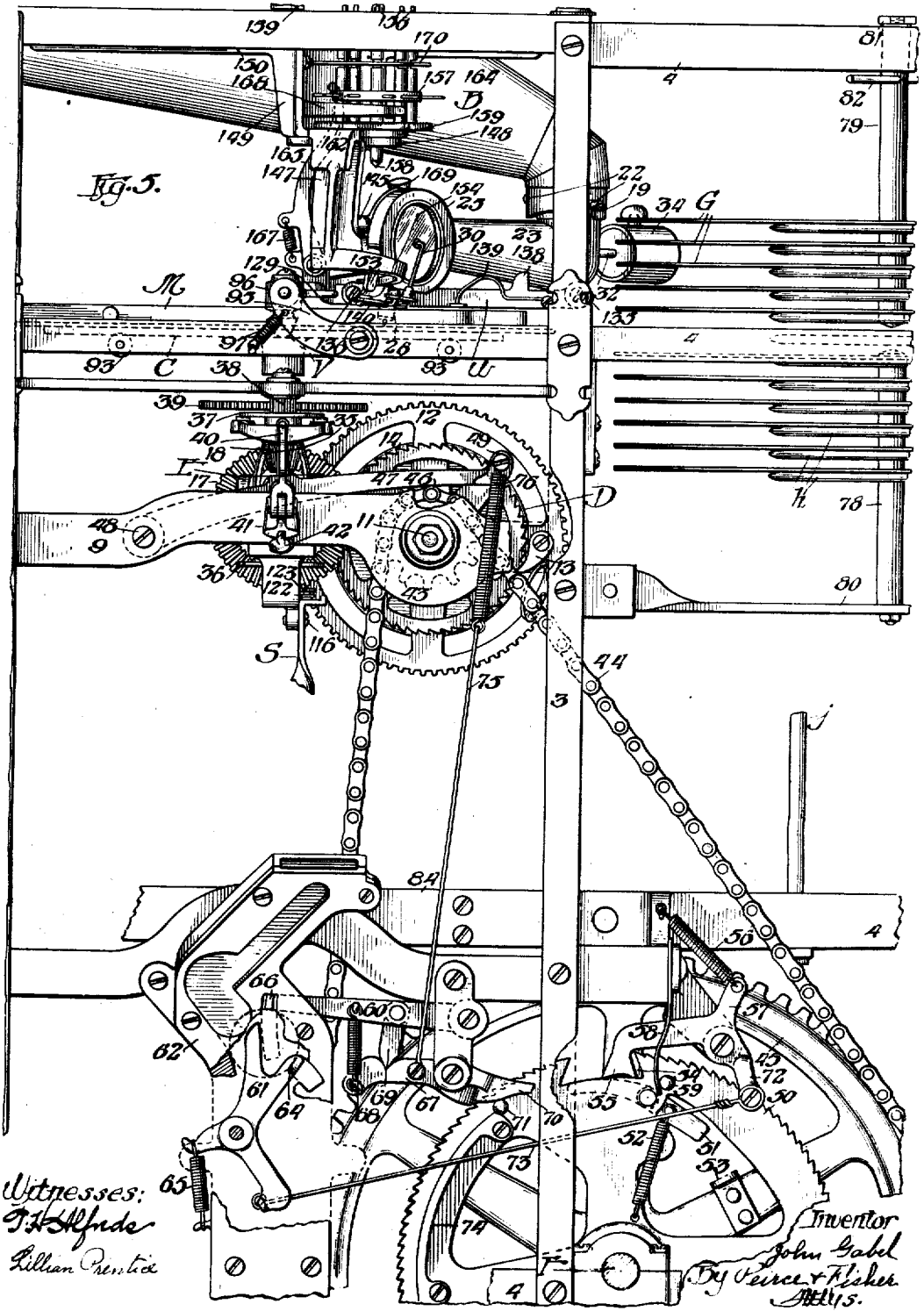

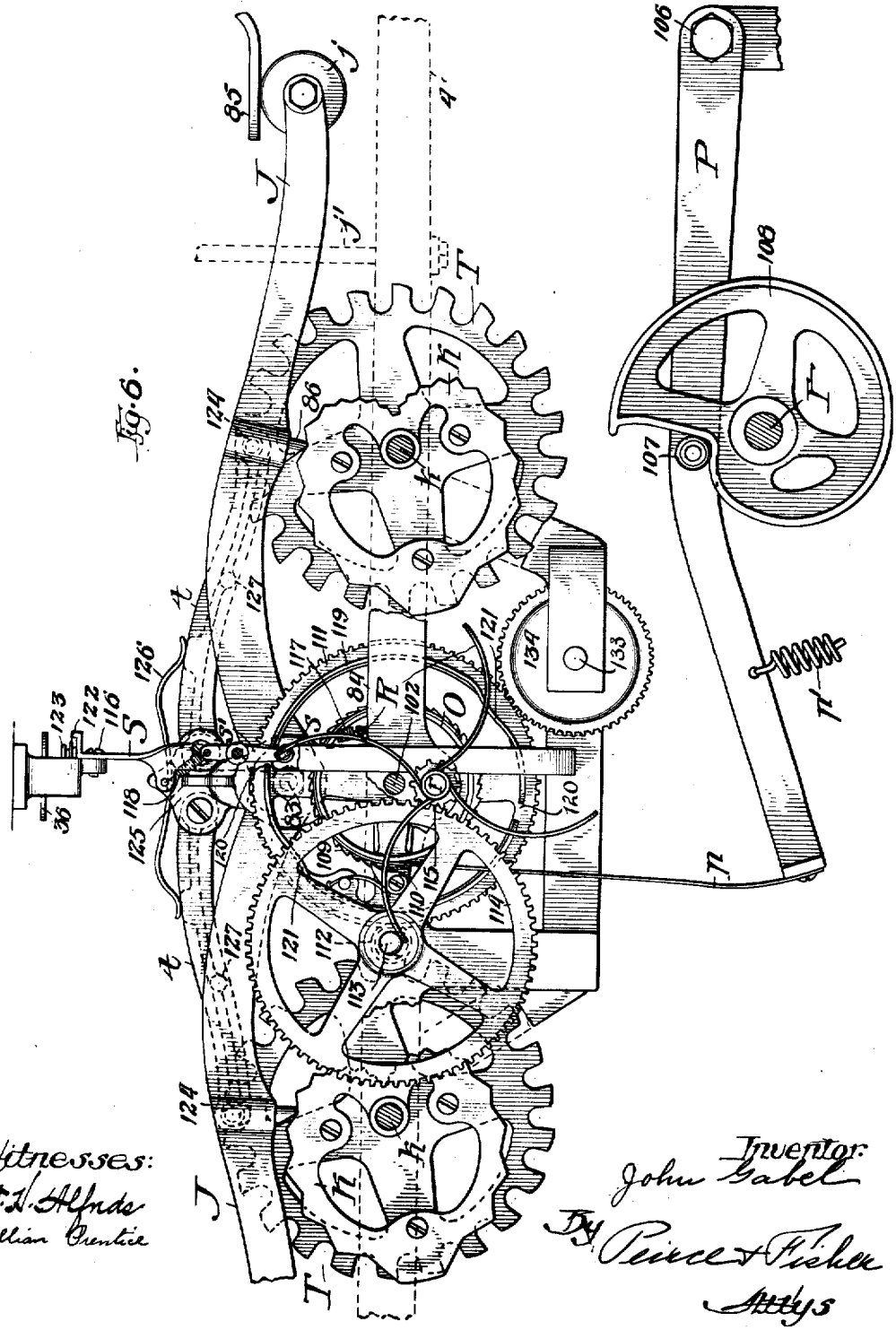

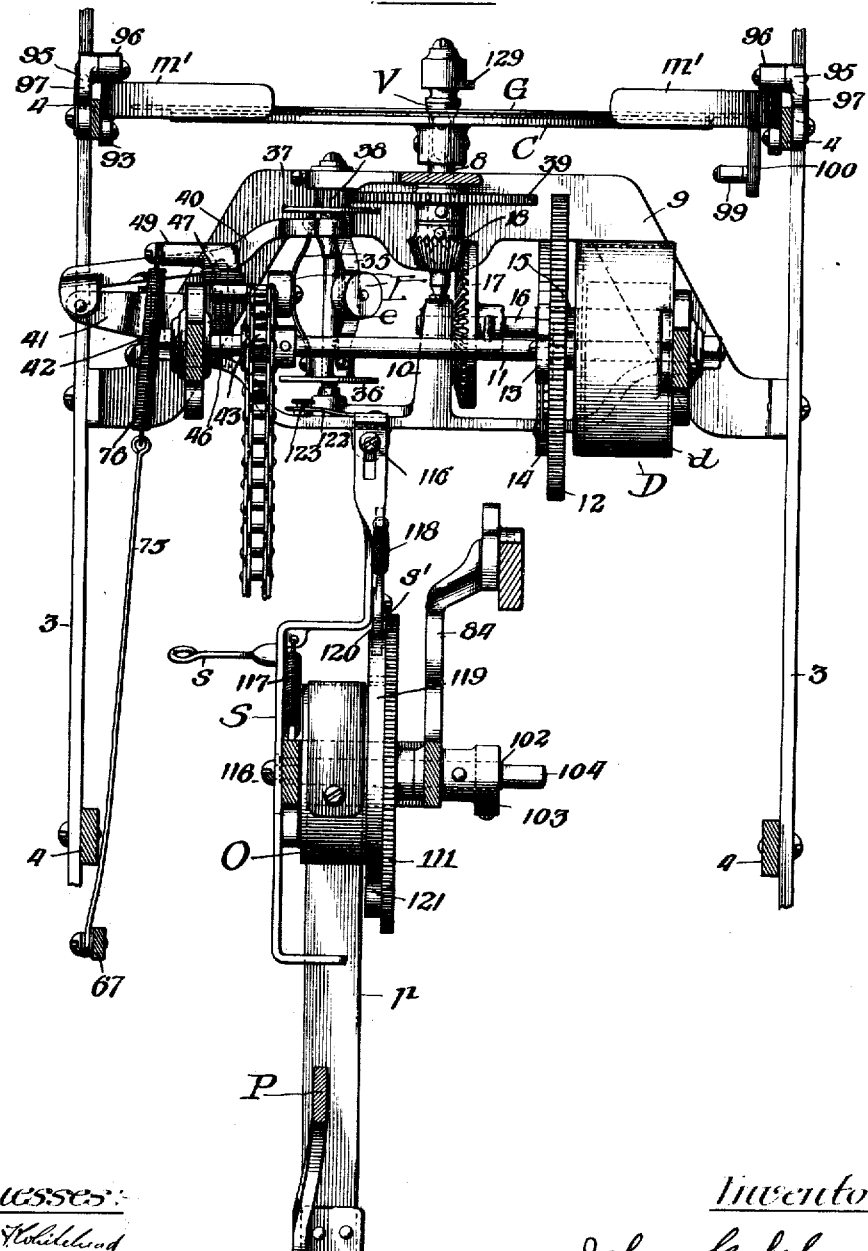

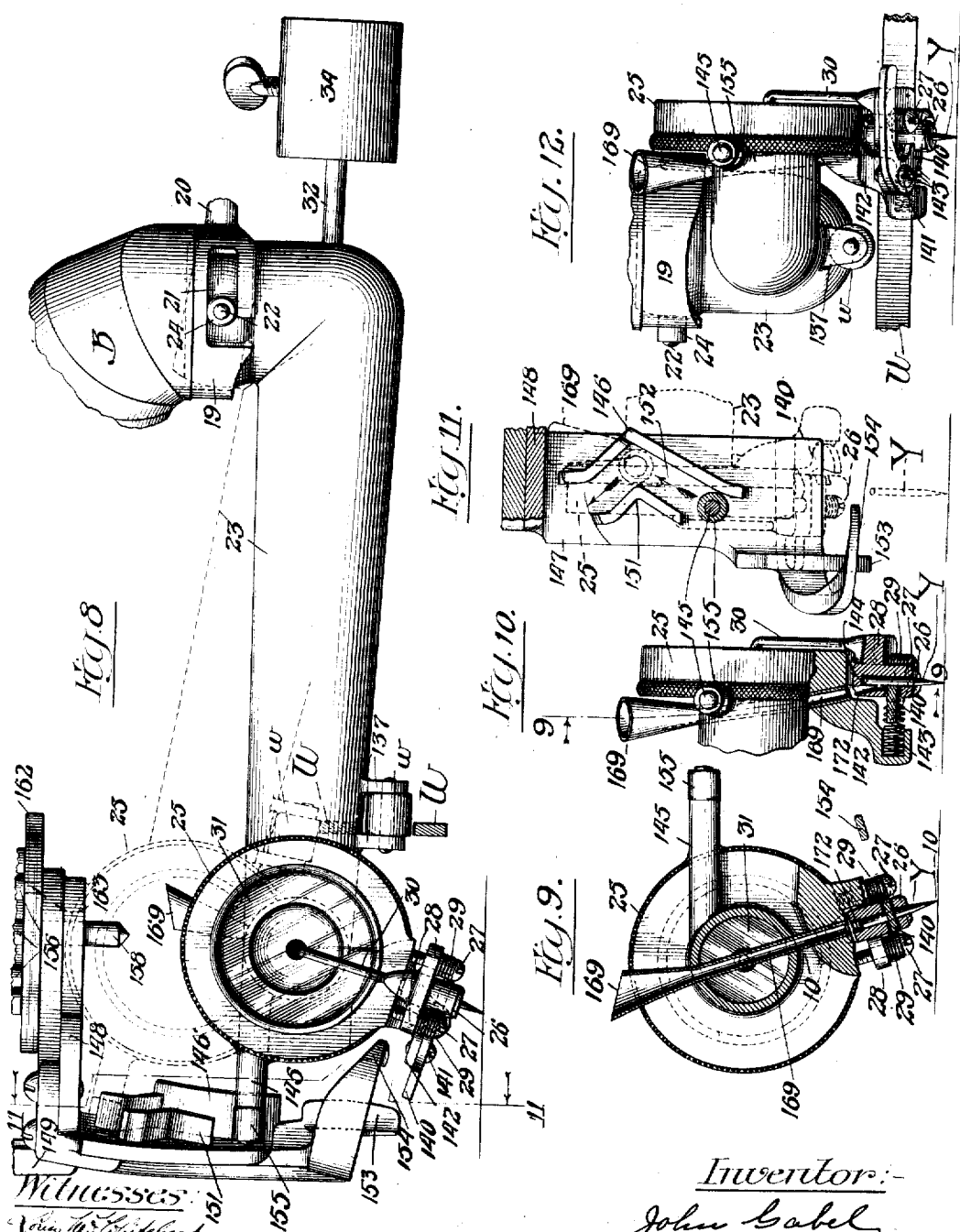

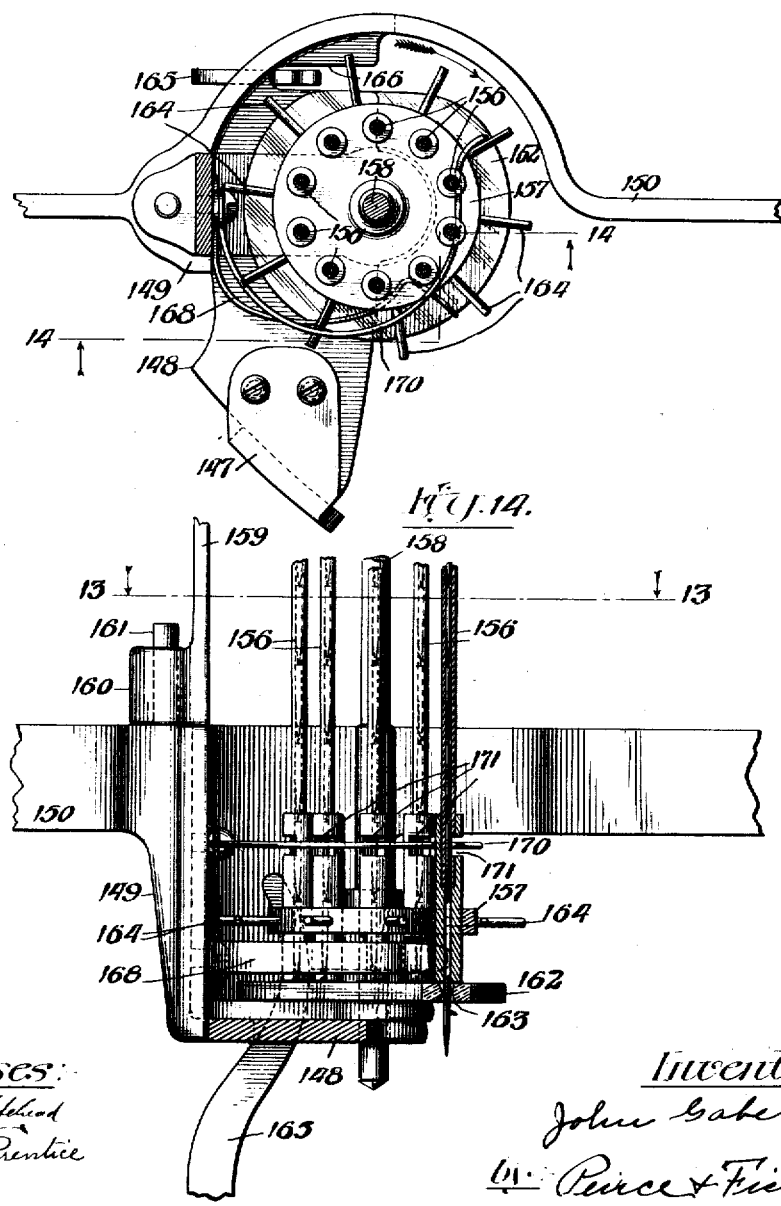

UNITED STATES PATENT OFFICE.

JOHN GABEL, OF CHICAGO, ILLINOIS.

AUTOMATIC TALKING-MACHINE.

1,134,603.

Specification of Letters Patent.

Patented Apr. 6, 1915.

Application filed February 26, 1906. Serial No. 302,878.

*To all whom it may concern:*

Be it known that I, JOHN GABEL, a citizen of the United States, and a resident of Chicago, county of Cook, and State of Illinois, have invented certain new and useful Improvements in Automatic Talking-Machines, of which the following is declared to be a full, clear, and exact description.

The invention relates to talking or sound-reproducing machines and seeks to provide, preferably in machines of the disk record type, automatic mechanism for changing the records or disks and for shifting the sound-box or reproducer into position to commence the reproduction of the record.

Further objects are to provide mechanism for automatically changing the sound-box needle or stylus; to provide means for automatically bringing a number of disks or records into operation, together with means whereby any particular record may be selected as desired by the user of the machine; to provide operating means for the automatic mechanism that may be coin-controlled so that all of the parts of the machine may be arranged within a suitable inclosing casing and to provide means for preventing the operation of the automatic mechanism when the talking machine is reproducing a record.

With these and other objects in view, the invention consists in the features of construction, and combinations of parts hereinafter set forth, illustrated in the accompanying drawings and more particularly pointed out in the appended claims.

In the drawings, Figure 1 is a front elevation of the improved machine as arranged within an inclosing casing. Fig. 2 is a plan view thereof with the casing and other parts shown in section on the line 2—2 of Figs. 1 and 3. Fig. 3 is a rear elevation of the operating mechanism with the casing in section. Fig. 4 is an enlarged detail plan view of a portion of the operating mechanism, certain parts being in section on the line 4—4 of Fig. 3. Fig. 5 is a partial front view of the parts shown in Figs. 3 and 4. Fig. 6 is a front elevation of parts of the operating mechanism and with certain parts shown in section on line 6—6 of Fig. 4. Fig. 7 is a side elevation of the parts shown in Figs. 5 and 6 and with the machine frame in section. Fig. 8 is a side elevation of the sound-box or reproducer, its supporting arms and means for controlling its shift. Fig. 9 is a detail elevation showing the side of the sound-box opposite to that shown in Fig. 8 and with certain parts in section on line 9—9 of Fig. 10. Fig. 10 is a front view of the sound-box with parts in section on the line 10—10 of Fig. 9. Fig. 11 is a face view of the cam plate that controls the shift of the sound-box, parts being shown in section on line 11—11 of Fig. 8. Fig. 12 is a front view of the sound-box and its supporting arm. Fig. 13 is a horizontal section through the needle carrier or magazine taken on the line 13—13 of Fig. 14. Fig. 14 is a front elevation of the lower portion of the needle magazine with certain parts shown in section on the line 14—14 of Fig. 13.

To prevent improper interference with the machine and its operating mechanism, all parts are inclosed within a suitable upright casing A that is rectangular in section, as shown in Fig. 2, and that is provided with a removable back portion *a* to afford access to the mechanism. The front and sides of the casing may be provided with glazed openings 1 through which the operation of the mechanism may be viewed. The casing is mounted on feet 2 and the amplifying horn B on the machine extends through the top of the casing at one side thereof, with its bell or mouth *b* opening at the front. The operating parts are carried within the casing upon a frame consisting of a number of upright bars 3 that are connected by a number of horizontal longitudinally extending bars 4 (see Fig. 3) and by horizontal cross bars 5 (see Fig. 2). These bars are of metal and are securely connected to form a rigid frame that is mounted within the casing upon a pair of supports 6 (see Fig. 3) and held therein against movement by lugs 7 on the side walls of the casing. The lugs 7 are preferably removably held in place by screws so that by removing the back of the casing and detaching the lugs, the frame work and parts carried thereby may be taken out for repairs and the like.

As stated, the machine is particularly adapted for use in connection with flat disk records, and for this purpose the horizontal, rotatable turn-table C for the disk records (see Figs. 2, 3, 5 and 7) is carried upon the upper end of a short vertical shaft 8 in the upper, central portion of the frame. The turn-table shaft and its operating mechanism is mounted upon a supplemental rigid frame 9 (see Fig. 7) that is secured to the upper ends of the central uprights 3 of the main frame. The lower conical end of the turn-table shaft 8 is stepped within a suitable bearing upon an upright lug 10 of the supplemental frame 9, and its upper end projects through a cross bar of the frame and supports the turn-table C. The turn-table is driven preferably by a spring motor, the casing D of which is fixed to the rear cross bar of the frame 9. A coiled spring $d$ within the casing is fastened at one end thereto and at its other end to a horizontal shaft 11 that extends through the casing and is journaled in the front and rear cross bars of the frame 9. A gear 12 loose on shaft 11 (see Figs. 5 and 7), is provided with a spring-held pawl 13 arranged to engage a ratchet wheel 14 that is fixed to the shaft so as to be driven thereby when the spring rotates the shaft 11 in one direction but permitting the spring to be wound up by rotating the shaft in the opposite direction without moving the gear 12. This gear meshes with the pinion 15 (see Figs. 3 and 7) that is carried upon a short, horizontal shaft 16 journaled in the supplemental frame 9 and arranged parallel with the motor shaft 11. A beveled gear 17 on the forward end of the shaft 16, meshes with the beveled pinion 18 on the lower end of the turn-table shaft 8. The turn-table is thus driven from the spring motor by the train of gearing described.

The amplifying horn B within the top of the casing A extends from the center of the casing outwardly toward one side thereof. At its outer end the horn is provided with an upturned elbow that projects through the top of the casing and connects with the bell or mouth piece $b$. At its inner end the horn is provided with a downturned elbow portion that is provided with a ring 19 having an off-set 20 (see Figs. 2 and 8) by which it is secured to one of the uprights 3 of the frame. The horizontal ring 19 is provided on opposite sides with a pair of horizontal slots 21 within which set pins 22 that are fixed to the outer upturned end or elbow portion of a hollow reproducer arm 23. The pins 22 are preferably provided with anti-friction rollers 24 that fit within the slots 21. At its inner end the arm 23 is provided with a horizontally turned elbow portion that carries an upright sound-box 25. A needle or stylus holder 26 is connected to the sound-box by two screws 27 that extend loosely through ears 28 on the stylus holder and are threaded into the sound-box. Springs 29 are coiled about the outer ends of the screws and interposed between the heads thereof and the ears 28 yieldingly hold the stylus support in position. The stylus support or holder 26 is provided with an arm 30 that is connected to the diaphragm 31 of the sound-box. At its outer end the hollow reproducer arm 23 is provided beyond its connection with the horn, with a rod 32 extending in line with the arm and carrying a counter-weight 34, which may, if desired, be adjustably mounted on the rod 32. The sound-box and reproducer arm are moved over the surface of the disk records on the turn-table C in the usual manner by the engagement of a needle or stylus thereof with the spiral record groove of the disk. During this movement of the arm the pins 22 thereof move in the horizontal slots 21 of the ring 19 on the end of the amplifying horn. At the same time the arm is free to swing vertically upon the pins to allow for any irregularity in the record or in the movement thereof. The weight of the reproducer arm and parts carried thereby are nearly counter-balanced by the weight 34 so that the needle will not bear with too great pressure on the disk. At one end the horizontal slots 21 of the ring 19 are open so that the reproducer arm may be readily connected and disconnected from the horn. It will be understood in the ordinary travel of the arm, the pins 22 will not come opposite the open ends of the slots. As indicated in Figs. 8 and 12, that portion of the elbow on the outer end of the arm 23 that projects within the ring 19 in the horn, is in the form of a head having a surface which constitutes a segment of a sphere so that a sound-tight joint between the arm and horn will be maintained in spite of the universal movement of the arm with reference to the ring.

The speed of the turn-table and the disk record supported thereby is controlled by a suitable centrifugal governor that comprises, in the form shown, weights E (see Fig. 7) mounted centrally on bowed springs 35 that are fixed at their ends to lower and upper collars 36 and 37 that are mounted upon a vertical governor shaft $e$. This shaft is journaled at its upper and lower ends in the supplemental motor frame 9 and the upper end of the shaft is provided with a pinion 38 meshing with a gear 39 on the short turn-table shaft 8. The collars 36 and 37 have expanded friction disk portions and the lower collar 36 is fixed to the shaft while the upper one is loosely mounted thereon. An arm 40 is pivoted at its forward end to the end of a lug 41 on the forward part of the motor frame 9. The rear end of this frame is forked (see Fig. 5) and provided with pads of felt or like material arranged to engage the friction disk or collar 37. A screw 42 threaded through the lug 41 engages the arm or lever 40 and adjusts its position to thereby vary the speed of the turn-table. In operation, the weights E fly outwardly and draw the disk 37 down upon the end of the arm 40 so as to check the rotation of the turn-table C and compel it to rotate at a uniform rate of speed.

The motor shaft 11 is provided on its forward end with a small sprocket wheel 43 (see Figs. 3, 5 and 7). A chain 44 passes over this wheel and over a large sprocket wheel 45 mounted on a shaft F. Shaft F is journaled in suitable bearings on the horizontal bars 4 at the lower end of the frame, and its forward end projects through the front of the casing A and is provided with a crank handle *f* (see Fig. 1). The sprocket chain 44 (see Fig. 7) is provided at one point with a horizontal projecting stud 46 that is arranged to engage and lift an arm or lever 47 that is pivotally connected by a stud 48 to the motor frame 9 and projects laterally beneath the governor arm 40 so that the latter is lifted with the arm 47 and its inner end pressed firmly into engagement with the governor disk 37 to stop the operation of the turn-table C. The pin or stud 46 on the chain 45 is so positioned that it will engage the arm 47 to lift it and the governor arm 40 and thereby stop the rotation of the disk C, after the latter has been driven for a sufficient length of time to reproduce the sound record thereon. It will be understood that the sprocket wheels 43 and 45 and sprocket chain 44 are moved in one direction to wind up the motor spring *d*, and are driven by the spring in the opposite direction, while the turn-table is rotated to reproduce a record thereon. By this arrangement when the large wheel 45 is turned in one direction to wind up the motor, the pin 46 on the chain 44 will be moved away from the arm 47 and the inner end of the governor arm 40 will move away from the disk 37 so that the turn-table may rotate. During the rotation of the turntable, the chain is driven in the opposite direction and as soon as the pin 46 thereon engages and lifts arms 47 and 40, the operation of the motor and turn-table will be arrested. When the pin 46 moves from under the arm 47 the latter is lowered until a forwardly projecting off-set stud 49 thereon (see Figs. 6 and 7) comes into engagement with the front bar of the motor frame 9. Although the large sprocket wheel 45 thus rotates in opposite directions, the winding shaft F rotates only in one direction and the wheel 45 is therefore loosely mounted on the shaft. A ratchet wheel 50 (see Fig. 5) fixed to the shaft F in front of the sprocket wheel 45, carries a pivoted pawl or dog 51. A spring 52 connected to the ratchet disk and to the pawl is arranged to shift and hold the latter in line with the lug 53 fixed to and projecting forwardly from one of the arms of the sprocket wheel 45. The tail of the pawl 51 extends opposite a notch 54 in the periphery of the ratchet disk 50, and, in the normal position of the ratchet wheel or disk 50, a trip pawl or dog 55 projects within the notch 54. This pawl is pivotally mounted on the frame and a spring 56 extends between the frame and a lug 57 on the pawl and tends to project it within the slot 54. The end of the trip pawl 55 is wide enough to engage the notch 54 in the ratchet disk 50 and to also engage the tail of the pawl 51, and spring 56 of the trip pawl or dog 55 is stronger than the spring 52 of the pawl or dog 51 so that the latter is normally held in the position shown in Fig. 5, against the tension of its spring 52 and out of line with the lug 53 on the sprocket wheel 45. When the pawl 55 is in the notch 54 the ratchet disk 50, shaft F and winding handle *f* are locked. Suitable means are provided for lifting the dog or pawl 55, and when this is done shaft F is unlocked and spring 52 moves the dog or pawl 51 into line with the lug 53 on the sprocket wheel 45. Then by turning the handle, the dog 51 on the ratchet wheel may be brought into engagement with the lug 53 to turn the sprocket wheel and wind up the spring motor. The parts are so positioned that, when dog 51 engages the lug 53 the locking pawl 55 will engage the teeth of the ratchet 50 and will prevent the return movement thereof. It will also prevent the return movement of the sprocket wheel 45 and of the motor shaft 11 until shaft F and ratchet disk 50 have been moved through a complete revolution and brought the notch 54 of the disk again beneath the end of the pawl 55. When this occurs, dog 55 will drop into the notch 54, lock the ratchet wheel and shaft F and will engage the tail of the pawl 51 to trip it out of engagement with the lug 53 on the sprocket wheel 45. The latter wheel and the motor shaft are then free to be driven by the spring motor in the opposite direction as disk C is rotated in reproducing the record thereon. By this arrangement the user of the machine is compelled to completely wind up the motor before it can operate to rotate the turn-table and at the same time he is prevented from overwinding the motor. The end of a stiff leaf spring 58 fixed to the frame is arranged to engage a pin 59 on the face of the ratchet disk as it approaches the end of a single revolution, and as the pin snaps by the end of the spring 58 the movement of the ratchet wheel is checked so that the locking disk or pawl 55 will invariably drop into the notch 54 of the ratchet wheel to check its forward movement and lock it after it has made a single revolution. Pawl or dog 55 is preferably shifted out of the notch 54 by a coin-controlled mechanism comprising a pair of levers or arms 60 and 61 that are pivotally mounted on the frame on opposite sides of a suitable coin chute 62 that leads from a slot 63 (see Fig. 1) in the front of the machine casing. The lever or arm 61 is provided on its end with an off-set lug 64 that projects through a transverse slot in the coin chute. A spring 65 connected to the arm normally holds the lug 64 in position to engage and arrest the inserted coin as indicated in dotted lines in Fig. 5. The lever or arm 60 is provided on its end with an off-set lug 66 that projects through a transverse slot in the coin chute and is normally held in a position above the coin when the latter is arrested by the lug 64 on the arm 61. A lever or arm 67 pivoted between its ends to the frame below the pivot of the arm 60 is connected at one end to the arm 60 by a coiled spring 68. A link 69 pivoted to the arm 60 is provided with a V-shaped end arranged to engage and rock within a correspondingly shaped bearing in the edge of the arm 67. Link 69 holds the arms 60 and 67 properly spaced apart and spring 68 holds the arm or lever 67 into engagement with the end of the link 69. The opposite end of the arm or lever 67 is provided with a cam portion 70 that is normally arranged adjacent a pin 71 on the ratchet disk 50. A projecting arm 72 on the pawl 55 is connected by a link or rod 73 to the lower end of the arm or lever 61.

It will be noted that the notch 54 of the ratchet disk 50 is somewhat larger than the end of the locking pawl 55 so that a slight initial movement may be given to the ratchet wheel by turning the handle $f$ of the shaft F. By this slight initial movement the pin 71 on the ratchet disk will press upon the cam portion 70 of the arm or lever 67 and turn the latter together with the arm or lever 60. If a coin has been inserted and arrested between lugs 64 and 66 on the levers 61 and 60, this movement of the lever 60 will shift the arm 61 so that the latter, through the medium of the connecting rod or link 73, will lift locking pawl 55 from the notch 54 of the ratchet disk so as to permit the continued forward movement of the shaft F. As the ratchet disk 50 is turned, a segmental ledge 74 thereon will be brought into engagement with the end of the arm 67 so that the parts actuated thereby will be held in shifted position until the pawl 55 is brought into engagement with the teeth of the ratchet disk 50. The lugs 66 and 64 on the levers 60 and 61 are so positioned that, during the movement described, the coin will be pushed past the lug 64 down into the casing of the machine. By providing a yielding spring connection 68 between the levers 67 and 60, it is impossible to break the parts should the coin become stuck in the chute.

The lever 67 is connected by a link or rod 75 and a coiled spring 76 to the lug 49 on the end of the lever or arm 47. In the normal stationary position of the parts as stated, this arm is upheld by the pin 46 on the chain 44 and through the medium of the spring 76 and rod 75 the levers 67 and 60 are also upheld with the end of the lever 67 in engagement with the pin 71 on the ratchet disk 50 and with the lug 66 on the lever 60 in its uppermost position indicated in the drawings. When the motor is wound up, pin 46 is moved from beneath arm 47 so that the latter drops down until the lug 49 thereon engages one of the cross bars of the frame. This also lowers the levers or arms 60 and 67 so that the lug 66 on the lever 60 is positioned in the center of the coin chute, and it is possible for the coin to drop in place between the lug 66 and the lug 64 on the arm 61. By this arrangement, it is impossible to release the winding mechanism until the motor has operated a sufficient length of time to reproduce the entire record on the turn-table, but when the pin 46 again engages the arm 47 to arrest the motor, as described, lever arms 60 and 67 will be lifted and lug 66 on arm 60 moved back to its normal position indicated so that the winding mechanism may be again released.

The disk records G are preferably carried by two magazines or holders arranged on opposite sides of the turn-table C. In the form shown, each magazine or holder (see Figs. 2, 3 and 5) comprises a frame H mounted to slide on a pair of vertical rods 77 that are fixed at their ends to the metal frame work of the machine. Each holder frame H is provided with a vertical series of inwardly projecting horizontal rods $h$ that are arranged in pairs and upon which the separate disk records G are supported. The disk records are provided with the usual center openings and through the central openings or holes of the set of disks on each holder or magazine, extends a pair of fixed vertical pins 78 and 79. The lowermost pin is fixed to a cross piece 80 of the machine frame and the uppermost pin is connected to a cross piece 81. The adjacent ends of these pins are spaced apart as shown, at a point in line with the turn-table C. The pins 78 and 79 prevent the displacement of all of the records G from the holder or magazine, except the record that is opposite the space between the ends of the pins and opposite the turn-table C. The uppermost pin 79 of each pair is however (see Fig. 5) threaded into the cross bar 81 and is provided with a cross pin or handle 82 by which it may be unscrewed and removed from place so that when the back of the machine is open the disk records may be changed as desired.

Suitable means are provided for shifting the holders or magazines to bring any one disk opposite the space between the pins 78 and 79 so that it may be shifted from the holder or magazine onto the turn-table. Such means preferably comprises a pair of arms J (see Figs. 3, 4 and 6) that are pivotally mounted at their inner ends on a stud 83 fixed to a supplemental motor frame 84 that is suitably connected to the main frame beneath the main motor frame 9. The arms J extend in opposite directions from the stud 83 and are provided on their ends with rollers $j$ that engage inwardly projecting arms 85 fixed to the lower ends of the magazine or holder frames H. Each arm is provided with a beveled pawl 86 that engages a stepped heart-shaped, shifter cam K. The cams K are mounted upon a pair of horizontal shafts $k$ that are suitably journaled in the supplemental motor frame 84 and the forward ends thereof project through the front of the machine casing and are provided with turning knobs 87, as shown in Fig. 1. The arms J and record magazines or holders are supported in normal position by the cams K. By rotating the cams the magazines may be raised and lowered step-by-step to bring the records opposite the turn-table. Each arm J is guided between a pair of pins $j'$ fixed to the frame (see Figs. 3 and 4).

The magazines are each provided with a pointer 88 (see Figs. 1 and 2) that coöperates with a printed or written list within a frame 89 that is fixed to the machine frame. The list of course, contains the names of the several records of the adjacent magazine or holder and are arranged in corresponding proper order so that the user of the machine may bring the desired record or disk into position at the space between the holding pins 78 and 79 and opposite the turn-table C. The lists within the frames 89 and the ends of the pointers 88 are visible, as shown in Fig. 1, through the front glazed opening in the upper part of the machine casing.

Each record magazine or holder is preferably counter-balanced by a weight L (see Fig. 3) connected to the lower end of a wire cord 90 that extends over a guide pulley 91 at the top of the machine frame, and is connected at its other end to a lug 92 on the upper end of the magazine or holder frame H. The counter-weights L are preferably arranged within guide sleeves or tubes $l$ that are fixed to the frame.

The disk records are transferred to and from the holders or magazines by a reciprocating shifter or carriage M that is mounted to slide back and forth in the plane of the turn-table C (see Figs. 2, 3, 5 and 7). The shifter or carriage comprises a central brace bar $m$ and side bars $m'$ fixed to the end of the central brace piece, as most clearly shown in Fig. 2. The carriage or shifter is mounted to slide (see Figs. 5 and 7) on rollers 93 mounted on two of the horizontal bars 4 at the front and rear of the frame. Pins 94 (see Fig. 2) fixed to the vertical bars at the front and rear of the frame, are arranged to project over the side bars $m'$ of the carriage to prevent the displacement thereof. A pair of arms 95 (see Figs. 2 and 7) pivoted to the horizontal frame bars 4 at the front and rear of the frame, carry rollers 96 that are yieldingly pressed by springs 97 connected to the arms into engagement with the upper edges of the side bars $m'$ of the carriage or shifter. The ends of the side bars $m'$ of the shifter or carriage are bent inwardly (see Figs. 2 and 7) to engage the record disks G and the carriage is of such length that it will engage the disk upon the central turn-table and a disk upon one of the holders or magazines, the disk on the turn-table being located between the central bar $m$ and one end of the carriage, while the disk on the holder is between the central bar $m$ and the other end of the carriage. When the carriage or shifter is moved from one extreme position to the other, it will shift the record on the turn-table into one holder and move one of the disks on the other holder on to the turn-table. For example, if the shifter is moved from its left hand position shown in Fig. 2 toward the right, the disk on the turn-table will be moved into the right hand holder or magazine and the disk record on the left hand holder that is opposite the turn-table and between the left hand pins 79 and 78, will be shifted on to the turn-table. The end portions of the carriage or shifter do not in its movement pass over the turn-table C, but the central portion $m$ thereof, which passes over the turn-table from one side to the other as the carriage is shifted, is arranged to just clear the turn-table but to engage the edge of the disk thereon. To insure that this central bar $m$ shall engage the edge of the disk, it is provided with upwardly projecting inclined ribs 98 (see Fig. 2). The disk upon the turn-table is accurately centered thereon, as hereinafter described, and is thus held out of engagement with the sides of the carriage or shifter so that the latter does not interfere with the rotation thereof. The carriage moreover, does not interfere with the vertical shift of the magazine holders or carriers. In the drawings, the carriage or shifter is shown as in its left hand position so that it securely holds the disk thereon that is between the pins 78 and 79 against displacement, but this holder can be shifted vertically to bring any one of the disks thereon into position between the arms or side bars of the carriage. The adjacent ends of the pins 78 and 79 are pointed, as shown, so that they may accurately engage the central openings of the disks as the disk holders are shifted. The disk supporting pins $h$ are also pointed so that the disk will properly engage therewith as they are shifted back and forth by the carriage. As shown in Figs. 3 and 5, the roller 96 that engage the upper edges of the side bars $m'$ of the carriage or disk shifter are located in line with the center of the turn-table C and that the rollers 93 that engage he lower edges of the side bars $m'$ are positioned at equal distances on opposite sides of the rollers 96 so that the end of the carriage that is innermost and adjacent the turn-table will be securely held against vertical shift.

The central portion $m$ of the carriage is provided at its rear end with a horizontal pin or roller 99 fixed to a lug 100 depending therefrom. The upper forked end of a shifter arm N engages the pin or roller 99 (see Fig. 2). At its lower end arm N is connected by a pivot bolt or stud 101 to the lower portion of the machine frame. The shifter arm N is driven from a short shaft 102 that is journaled (see Figs. 3, 4, 6 and 7), in the supplemental motor frame 84. At its rear end the shaft is provided with a crank arm 103 that carries a pin 104 projecting within a cam slot $n$ in the shifter arm N (see Fig. 3). At each operation of the machine the shaft 102 is given a half revolution and operates to throw the shifter arm from one side to the other. The lower portion of the cam slot $n$ is loop-shaped and divided by a rib 105, while the upper portion of the slot is inclined. When looking at the machine from the rear, as shown in Fig. 5, the pin 104 moves through the lower part of the slot in moving the shifter arm from right to left and through the upper part of the cam slot in moving the arm from left to right. By the peculiar arrangement of the cam slot, the carriage is started and brought to rest slowly and easily and without shock or jar. Pin 104 is preferably provided with a roller that sets within the cam slot $n$.

A drum O (see Figs. 6 and 7) is loosely mounted on the front end of the short shaft 102. A steel tape $p$ passes over the drum and is fixed thereto at one end. The other end of the tape is secured to the free end of a shift lever P that is pivotally mounted on a stud 106 at one side of the lower portion of the machine frame. The shifter arm P extends over the shaft F and is provided with a pin 107 that engages a spiral cam 108 fixed to the shaft. A heavy spring $p'$ is connected to the arm and to the bottom of the inclosing casing and holds the pin 107 in engagement with the cam 108. Pin 107 is preferably provided with an anti-friction roller. Drum O is provided at its rear edge with a ratchet 109 arranged to engage a pivoted spring-held pawl 110 on a gear 111 that is fixed to the shaft 102. Gear 111 (see Fig. 4) meshes with a small pinion 112 on the rear end of a short shaft 113 that is journaled in the supplemental frame 84. A gear 114 on the front end of the shaft 113 meshes with a pinion 115 on a short shaft $r$ that is suitably journaled in the supplemental frame 84 and carries a governing fan R. Fan R is normally engaged by a horizontal pin $s$ that is fixed to and projects horizontally and forwardly from a bar S that is held in vertical position by screws 116 (see Figs. 6 and 7) passing through vertical slots therein. Bar S may thus move vertically to an extent limited by the length of the slots. A coiled spring 117 connected to the bar normally holds it in lowermost position with the pin $s$ thereon in engagement with the governor fan R. Bar S constitutes a stop device for controlling the operation of the shaft 102 that operates the carriage shifter N. The upper end of the bar is off-set rearwardly (see Fig. 7) and carries a pivoted dog $s'$, the upper end of which is connected to the bar S by a coiled spring 118. The gear 111 is provided on one face with a projecting rib 119 of substantially circular form (see Fig. 6). This rib is provided at diametrically opposite points with notches 120 within one of which the dog $s'$ normally extends. The motor spring $p'$ that is connected to the arm P, tends to turn the gear 111 in anti-clockwise direction, when viewed from the front of the machine as in Fig. 6, and the dog $s'$ is normally held in the position shown in Fig. 6 with its spring 118 under tension. The lower end of the stop device or bar S is turned rearwardly and projects in line with the path of movement of the arm P.

The drum O, as stated, is loosely mounted on the shaft and as the shaft F is turned thereon a single revolution the arm P will be lifted by the cam 108 on the shaft, thus winding up or placing the motor spring $p'$ under tension. During this vertical movement of the arm P, the steel tape $p$ is stiff enough to turn the drum O loosely on the shaft 102, the ratchet teeth 109 of the drum passing idly beneath the pawl 110 on the gear 111. At the end of its upward movement, arm P engages the lower end of the stop bar S and shifts it vertically against the tension of the spring 117. This movement of the bar S lifts the pin $s$ thereon out of engagement with the fan governor R and also lifts the dog $s'$ out of the notch 120 in the circular rib 119 of the gear 111. When the dog $s'$ clears the notch 120 its spring 118 shifts it so that, when the arm P again swings downwardly the dog will engage the circular rib 119 and hold the stop bar S up so as to prevent the pin $s$ thereon from dropping into engagement with the governing fan R. Arm P is drawn down by the motor spring p' as soon as the pin 107 thereon clears the shoulder of the spiral cam 108 on the shaft F. This is effected just as the winding shaft F reaches the end of its revolution. Motor spring p' then draws down arm P and through the strap p, drum O, ratchet 109 and pawl 110 turns the shaft 102 so that the latter moves the carriage shifter arm N and the carriage or record shifter is then operated to remove the record on the turn-table and place another record thereon. At the end of a half revolution of the shaft 102 which, as stated, is sufficient to move the carriage or record shifter from one side to the other, the dog s' on the stop bar S is drawn down by the spring 117 of the stop bar S into the other notch 120 of the rib 119, and the pin s engages the governor fan R so that the shaft 102 and parts operated thereby, are arrested. The rib 119 is provided just in front of the notches 120 (see Fig. 6) with depressed portions 121 in advance of the notches 120 to lower the dog s' and bar S slightly before dog s' drops into the notches. By this arrangement, the motor shaft 102 that operates the carriage or record shifter, is brought into operation and automatically arrested after it has completed a half revolution. The fan governor compels the even uniform operation of the shaft 102 under the influence of the motor spring p', and as stated the cam slot n and shifter arm N is so shaped that the record shifter and records are brought to rest slowly and without shock or jar.

It is desirable to prevent the operation of the turn-table C until after the record shifter has completed its movement. To effect this, the stop bar S is provided on its end with a laterally projecting spring strip 122 that carries a friction button 123 covered with felt or like material. As stated, the stop bar S is held in uppermost position during the movement of the record shifter since the dog s' thereon rides upon the rib 119. When in this uppermost position, the friction button 123 engages the disk 36 on the lower end of the governor shaft E and thus prevents the operation of the turn-table motor until after the record shifter has completed its movement.

It will be noted that the records are shifted by the carriage onto the turn-table alternately from the record holders or magazines on opposite sides thereof, and that when a record is shifted from one of the holders, the record on the turn-table is moved back into the other holder. When the carriage is shifted from left to right, a record in the left hand holder is moved onto the table and the record on the table is moved back into the right hand holder and when the carriage is shifted from right to left, a disk on the right hand holder is moved on the table and the disk on the table is moved into the left hand holder. Thus in both positions of the carriage one of the magazines is full of records while one record has been removed from the other magazine. It is necessary to prevent the vertical movement of the magazine from which a record has been removed, so that the record may be properly replaced therein by the movement of the carriage. It is also desirable to provide means for automatically shifting the magazines vertically to bring the disks successively opposite the turn-table and into engagement with the carriage or shifter. For these purposes, the shafts k that carry the cams K for vertically shifting the record magazines, are provided on their rear ends with toothed locking wheels T (see Figs. 3 and 4). The spaces between the teeth of these wheels are semi-circular in outline and are arranged to be engaged by pins or rollers 124 on the outer ends of a pair of pawls or arms t. These arms are pivotally mounted at their inner adjacent ends upon an upright portion or lug 125 of the supplemental frame 84. A leaf spring 126 fixed centrally to the lug 125, engages and depresses the pawls or arms t. When the pins or rollers 124 on the pawls t are down in the bottoms of the slots between the teeth of the wheels T, these wheels and the shafts k are locked so that the latter cannot be rotated to shift the magazines. The pawls t are provided with rearwardly projecting pins 127 which are arranged to be engaged by a lug 128 on the forward side of the shifter arm N. When the pin on one of the arms is engaged by the lug 128, the arm will be held in such position that the pin or roller thereon will only project slightly within one of the notches of the corresponding wheel T, as shown at the right hand in Fig. 3. The ends of the teeth of the wheels T are inclined and while, in its slightly raised position, the small arm t will prevent the rotation of the corresponding wheel in one direction, it will permit its rotation in the direction indicated by the arrow in Fig. 3, so that the user of the machine may move the magazine or holder at the right in Fig. 3 to bring any disk thereon into engagement with the disk shifter by turning the thumb button 87 of the corresponding shaft. The record holder or magazine at the left of Fig. 3, from which the record on the table has been removed, is locked against movement so that at the next operation of the machine it will be in proper position to receive the record on the table. When the arm N is shifted to move a disk from the magazine at the right in Fig. 3 onto the table, the lug 128 on the arm will move out from beneath the pin 127 on the right hand locking pawl so that the latter will lock the operating shaft and magazine on that side, and it will stay locked until the record has been returned to the holder. The movement of the arm carries the disk on the table back into the magazine at the left in Fig. 3, and at the end of its movement lug 128 on the arm will engage the pin 127 of the left hand locking pawl $t$ so as to release the shaft $k$ and the magazine operated thereby on that side. In this way the magazines or holders on opposite sides of the turn-table are alternately locked and unlocked as the record shifter or carriage is moved. When the carriage is at either end of its movement, the magazine at that end is unlocked so that the user may select the next disk that is to be moved onto the table at the next operation of the machine. The magazine or holder at the opposite side of the machine is however locked until the disk that has been removed therefrom is returned by the movement of the disk shifter. It will also be noted that while the shifter arm and carriage are moving, both of the shafts $k$ are locked against movement and neither of the magazines can be shifted.

For automatically shifting the magazines the crank arm 103 on the shaft 102 is provided at its end with a tooth $t'$ (see Fig. 3). The cam slot $n$ in the arm N is so shaped that, as stated, the arm and carriage are brought to rest slowly. It is also so shaped that the arm N and carriage reach the end of their movement before the crank arm 103 reaches the end of its movement. So that as the arm 103 and shifter arm N move to one side of the machine, the lug 128 at the end of the movement of the arm N first lifts the locking pawl $t$ to release the wheel T and shaft $k$ on that side and subsequently the tooth $t'$ on the arm 103 at the end of the movement of said arm is brought into engagement with one of the teeth of the wheel T, so that it and the shaft $k$ is advanced one notch to move the corresponding magazine and shift another disk into engagement with the disk shifter and opposite the turn-table C. By this arrangement, if the shafts $k$ are not turned by the users of the machine, a different record will be placed on the turn-table at each operation of the machine until all of the records have been successively reproduced. This automatic operation however, does not prevent the user of the machine from selecting any record in the magazine that is unlocked.

The record on the turn-table C is held in proper position thereon by a centering device V (see Figs. 2 and 7) that has a conical roller on its lower end arranged to extend through the central opening of the disk and into the recess of the central portion of the turn-table C. The centering device is carried upon the end of a forwardly extending, horizontal portion 129 of a vertically reciprocating shifter-bar $v$. This bar is mounted at the rear of the machine frame, its lower end being connected to the frame and guided by a screw 130 extending through a vertical slot therein. The upper end of the bar is arranged to slide through a U-shaped strap 131 fixed to one of the horizontal bars on the machine frame. The shifter V is raised and lowered to release and clamp the disks upon the turn-table by a spiral cam 132 (see Figs. 3 and 4) that is mounted upon the rear end of a horizontal shaft 133 journaled in the machine frame. The inner end of the shaft is provided with a gear 134 meshing with the gear 111 on the motor shaft 102. As stated, motor shaft 102 is given a half-revolution to operate the disk shifter. Gear 134 is exactly one-half the size of gear 111 so that it is given a complete revolution to first raise the centering device and release the record on the turn-table, and then to permit the downward shift thereof to engage and hold the new disk that is placed on the table. The lower end of the shifter rod is preferably V-shaped and sets within a correspondingly shaped notch in the cam 132 in the normal position of the parts so that the centering device is accurately held in its proper position. The shifter arm $v$ also serves to move the reproducer arm to the outer periphery of the disk on the turn-table to commence the reproduction thereof and the shifter arm also operates the needle changing mechanism. For these purposes a segmental track-bar W (see Figs. 2 and 5), is pivotally connected at one end by a stud 135 to the frame of the machine opposite the center of the turn-table. The other end of the track-bar W is pivoted to a lug 136 on the side of the horizontal portion 129 of the shifter rod $v$. The track-bar W is concentric with the center of motion of the hollow reproducer arm 23 and the latter is provided on its under side with a roller $w$ (see Fig. 8) journaled between a pair of lugs 137. In the normal, horizontal position of the track-bar W and with the needle of the reproducer arm resting upon the disk, the roller $w$ is above the track-bar W but out of engagement therewith. When the reproducer arm is in its innermost position the vertical shift of the rod $v$ will raise the inner end of the track bar W and the latter will engage the roller $w$ and lift the reproducer arm. The track bar W is then in inclined position so that the reproducer arm may slide down the same until the roller $w$ engages a lug 138 at the outer end of the track bar. A light spring 139 (see Fig. 5) on the track bar is arranged to engage the roller $w$ when the latter hits the lug 138 to prevent any rebound of the reproducer arm.

The needle or stylus Y (see Figs. 8 to 12) is arranged within the bore of the hollow cylindrical holder 26. A clamp 140 is connected by a pivot screw 141 to a lug 142 on the rear face of the sound box. This clamp is pivoted to swing in a plane at right angles to the holder 26. A coiled spring 143 arranged in a socket in the end of the lug 142 engages the end of the clamp 140 and presses it through a transverse slot in the side of the cylindrical holder 26 into engagement with the needle or stylus Y to hold the latter firmly in place. The inner end of the needle abuts against the shoulder 144 (see Fig. 10) at the inner end of the bore of the holder 26.

The sound box is provided with a finger 145 that extends in line with the reproducer arm 23. After a record has been reproduced the sound box and arm 23 are brought to rest with the end of the finger 145 against the lower end of a V-shaped cam plate 146 on a bracket 147. This bracket (see Figs. 2 and 5) is arranged above the turn-table adjacent the central portion thereof. It is secured at its upper end and depends from the horizontal plate portion 148 of a bracket 149 (see Figs. 5, 8, 13 and 14). Bracket 149 is cast in one piece with the frame bar 150 that is suitably secured at its ends to the metal frame of the machine. The bracket 147 is provided with a second V-shaped cam plate 151 arranged adjacent and parallel to the cam plate 146 so as to form a zigzag cam slot or guide-way. Plate 151 (see Fig. 11) is shorter than plate 146 so that the pin 145 may pass beneath it into engagement with the lower end of the plate 146. Bracket 147 is also provided at its lower end and at one side with a vertical trip cam 153 and with a hook-shaped abutment or stop 154. The cam 153 is so placed that when the sound box and reproducer arm are lifted by the shifter rod $v$ and rail W, it will engage the tail of clamp 140 and shift it against the tension of its spring 143 to release the needle and to permit it to fall from the holder 26. This partial raised position of the sound box is indicated by dotted lines in Fig. 11. When the reproducer arm and sound box are lifted, the end of the pin 145 will enter and pass through the V-shaped cam groove 152 and the reproducer arm and sound box will not slide down the rail W to the outer periphery of the record on the turn-table until after the pin 145 has passed out of the upper end of the slot. The end portion of the pin 145 that projects within the slot 152, is preferably provided with an anti-friction roller 155.

The stylus or needle magazine (see Figs. 1, 13 and 14) preferably comprises a circular series of vertical tubes 156 that are secured at their ends to and extend through a pair of upper and lower disks 157 mounted on a central shaft 158. Shaft 158 is journaled at its ends in the arms of a U-shaped holder 159. This holder is arranged to set at its lower end upon the plate portion 148 of the bracket 149. This bracket and the supporting frame bar 150 therefor, is semi-circular in form (see Fig. 13) to receive the rotary needle magazine. The U-shaped holder 159 is provided adjacent its lower end with an ear or perforated lug 160 that is arranged to engage and set over a vertical pin 161 on the bracket 149. The lower end of the shaft 158 which extends below the holder 159, is arranged to engage and project through a suitable opening or socket in the horizontal plate portion 148. The ends of the tubes 156 are open and the needles are inserted therein, one above the other with their pointed ends downward (see Fig. 14), the bores of the tubes being of sufficient size to readily receive the needles and permit the passage thereof through the tubes, but are small enough to hold the needles in upright position, one on top of the other. The lower open ends of the tubes are normally closed by a plate 162 that is fixed in position upon the lower arm of the U-shaped holder 159 below the ends of the tubes. This plate is preferably glass so that the points of the needles resting and moving thereon will not be injured. At one point the plate is provided with an orifice 163 (see Figs. 8 and 14), and suitable means are provided for rotating the needle magazine to bring the tubes 156 successively in line with the orifice 163. For this purpose the lower disk 157 is provided with a series of radial pins 164 and the horizontal portion 129 of the shifter rod $v$ is provided with a pivoted dog 165 that is arranged to project upwardly through a slot 166 in the horizontal plate portion 148. This dog is held by a spring 167 (see Fig. 5) against the end of the slot 166 and the dog is curved or cam-shaped so that when the shifter rod $v$ is lifted the end of the dog will be projected against one of the pins 164 to turn the needle magazine one step. A holding pawl 168 is preferably formed of a curved leaf spring secured at one end to the lower end of the upright portion of the magazine holder 159. The free end of the holding pawl 168 is V-shaped and projects between the lower ends of two of the tubes 156 and accurately holds the magazine in position with one of the tubes in line with the orifice 163 in the plate 162. When a tube is brought in line with the orifice, the lowermost pin therein will drop through into an inclined tube or guide-way 169 (see Figs. 8, 9 and 10) that is carried by the reproducer arm on the rear face of the sound box, the upper end of which is preferably expanded or hopper like. A stop device in the form of a bent spring 170 (see Figs. 13 and 14) is fixed at one end to the upright portion of the magazine holder 159. The needle holding tubes 156 of the magazine are provided some distance above their lower ends with transverse slots 171 and the free end of the stop spring 170 is arranged to project within the slot of the tube over the orifice 163 and engage the second needle therein so that only one needle will fall through the orifice 163 when the tube is brought in line therewith. As soon as the tube passes beyond the end of the stop device, the needles therein will drop down but will be arrested by the glass plate 162. In this way the needles may be fed one at a time at each operation of the machine. Holder 159 of the needle magazine is preferably removable through an opening (indicated in dotted lines in Fig. 1) in the top of the machine casing, so that the magazine may be refilled with needles from time to time. This particular form of magazine however, will hold a very large number of needles that will be accurately fed, one at a time as the machine is operated, and, as is well known, it is highly desirable to change the needle at each operation of the machine.

The guide tube 169 is arranged in line with an inclined orifice 172 in the needle holder 26 that opens into the central bore thereof just below the shoulder 144 (see Fig. 10). As the reproducer arm and sound box are lifted by the vertical movement of the shift rod $v$ and rail W, the end of the pin 145, as stated, will be guided in the V-shaped cam slot 152. The tail of the clamp 140 will be brought against the cam 153, and as soon as the sound box is partially lifted or about in the position indicated in dotted lines in Fig. 11, the old needle will drop from the holder 26. As the sound box approaches the upper end of its movement, it will be shifted by the engagement of the cam groove with the pin 145 thereof to bring the needle holder over the end of the hook-shaped abutment or stop 154. At this point, and while the clamp 140 is still held in released position by the cam 153, the dog 165 on the shifter rod $v$ will turn the needle magazine so that a new needle will drop therefrom through the guide tube 169 and guide opening 172 into the central bore of the needle holder 26. It will not fall out of the same but will be arrested in position within the holder by the abutment or stop 154. At the end of the upward movement of the sound box the tail of the clamp 140 will pass over the upper end of the cam 153 and the spring 143 will shift it to grip and hold the new needle. At the same time, the pin 145 on the sound box escapes from the upper end of the cam slot 152 and the sound box and reproducer arm slide down the then inclined rail W to the outer periphery of the disk on the turn-table.

To insure that the reproducer arm will always be brought to rest in such position that the pin 145 will engage the guide groove 152 when the sound box is lifted, the several disks, the record portion of which frequently vary in length, are provided with spiral grooves 173 (see Fig. 2) leading inwardly from the end of the record portion to a circular groove 174 which is so located that it will hold the pin 145 on the end of the reproducer arm against the cam plate 146. To guide the needle into the beginning of the record groove the disks are also preferably provided with spiral grooves 175 leading inwardly from the edge thereof to the beginning of the record groove.

The operation is as follows: The sound box and reproducer arm are normally at their innermost end of their table with pin 145 thereon in engagement with the lower end of the cam plate 146 and the record previously reproduced is on the turn-table C. In this position, the pin 46 on the chain 44 holds the arm 47 elevated so that the governor arm 40 is held in engagement with the disk 37 to prevent the operation of the turn-table, and the lug 66 on the lever 60 is held in its uppermost position so that a coin may be dropped to position upon the lug 64 of the lever arm 61. In this position too, the disk record magazine or holder from which one of the records has been removed (in this instance the magazine at the right of the machine casing when viewed from the front) is locked against movement but the magazine at the left may be shifted if desired, by means of a button 87 on the front of the machine casing to bring any one of the disks between the arms at the left hand end of the disk shifter or carriage. If a coin is dropped into the chute 62 it will be arrested upon the lug 64 of the lever 61. The user may then turn the shaft F by means of the exterior handle $f$. The first initial movement of the shaft and ratchet wheel 50 thereon will as described, through the medium of the lever arms 67, 60 and 61 and rod 73 lift the locking pawl 55 out of the notch 54 of the ratchet 50 so that the shaft F may be turned and the dog 51 brought in line with the lug 53 on the sprocket wheel 45. The shaft F may then be turned through a single revolution or until the locking pawl again engages the notch 54. The spring $d$ of the turn-table motor is wound up as described, through the medium of the chain 44 and sprocket wheel 43 on the motor shaft. Pin 46 on the chain is drawn from beneath the lever arm 47 so that the governor arm drops out of engagement with the disk 37 and so that the lug 66 on the lever arm 60 is lowered into mid-position in the coin chute to prevent the operation of the machine by another coin until the initiated operation is completed. The reëngagement of the locking pawl 55 with the notch 54 of disk 50 throws the dog 51 out of engagement with the lug 53 on the ratchet wheel 45 so that the spring $d$ may turn the parts connected thereto in opposite direction to drive the turn-table. As the shaft F is rotated the cam 108 thereon lifts the arm P, energizes the motor spring $p'$ and lifts the stop bar S thus shifting the dog $s'$ thereon to free the shaft 102 and permit the operation of the automatic mechanism for changing the record disks and needle and restoring the reproducer arm. This shift of the stop device S also, as described, brings the button on its spring arm 122 against the lower disk of the governor and it is held in this position by the engagement of the pawl $s'$ with the circular rib 119 until the shifter mechanism has changed the plates and moved the reproducer arm. When the pin 107 on the arm P passes over the shoulder of the cam 108, the motor spring $p'$ is thrown into operation to turn the shaft 102 through a half-revolution and turn the shifter cam 132 through a single revolution. As stated, the lower end of the shifter rod $v$ is pointed or V-shaped and sets within a correspondingly shaped notch in the cam 132. By reason of this arrangement, the instant the motor spring $p'$ is thrown into operation the centering device on the shifter rod $v$ is quickly lifted to release the disk on the turn-table. The continued movement of the shaft 102 through its half-revolution moves are arm N and carriage M to change the plates, and at the end of its movement to one side the tooth $t'$ on the arm 103 of the shaft engages one of the wheels T to automatically shift the disk magazine on that side one step. The movement of the shifter arm N, as stated, also automatically locks the magazine from which the record is taken and unlocks the magazine on the other side into which the disk on the table is moved by the shift of the lug 128 on the arm N from beneath the pin 127 on one pawl $t$ and by its reëngagement with the pin on the other pawl. The movement of the motor shaft 102 as stated, is arrested after a half-revolution by the engagement of the dog or pawl $s'$ on the stop bar S with the notch in the rib 119 of the gear 111 on the shaft. After the first quick initial shift of the rod $v$, the continued movement of the cam 132 lifts this rod more slowly to raise the reproducer arm and sound box through the medium of the track bar W, and to turn the needle magazine through the medium of the dog or pawl 165. The reproducer arm is guided as described, during its upward shift by the engagement of the pin 145 thereon with the V-shaped cam slot 152 and the clamp 140 is shifted by its engagement with the stationary cam 153 to release the used needle and grip the new needle from the magazine that is guided into the needle holder 26 by the tube 169. Near the end of the movement of the cam 132 the shifter rod is in its uppermost position and the reproducer arm slides outwardly toward the periphery of the disk on the turn-table and at the end of the movement of the cam the shifter rod $v$ and centering device V are dropped to position to securely center and hold the disk upon the turn-table and also to lower the sound box and needle on the reproducer arm into engagement with the disk. The centering device V is, as previously described, provided with a conical roller on its lower end, which, when the centering device is lowered, is arranged to engage the central opening of the record and thereby accurately center the record on the turn-table, or, in other words, move or adjust it to proper central position thereon. In this way the shifted record is accurately centered or adjusted to proper position on the turn-table, and, at the same time, it is moved out of contact with the parts of the sliding carriage or record shifter, so that the latter, as shown in Fig. 2, does not contact with the record on the turn-table during the reproduction thereof. By means of the depressions 121 on rib 119, the stop device 123 will release the governor of the turn-table motor just before the needle is lowered into engagement with the disk on the turn-table so that the latter acquires a slight impetus before it is engaged by the needle. The turn-table, together with the disk thereon, are then rotated by the operating motor therefor, and the needle is guided by the spiral groove 175 into the beginning of the record groove of the disk. The reproducer arm and sound box are then swung inwardly as the needle passes through the record groove in the well-known manner to reproduce the same. It will be noted that as soon as the shaft F has been turned through a slight arc, the pawl 55 will engage the ratchet teeth of disk 50 and the winding shaft cannot be returned to its initial position, but must be rotated forwardly through a complete revolution before the actuating mechanism can be released into operation. In this way, the user is compelled to wind up the motor spring sufficiently to completely reproduce the record on the turn-table. Moreover, while the record is being reproduced the lug 66 on the arm 60 is lowered in the coin chute so that another coin cannot be inserted to release the winding shaft. At the end of its movement, the sound box will be shifted by the engagement of the needle with the spiral groove 173 until the pin 145 engages the lower end of the cam plate 146. The pin 46 on the chain 44 will then reëngage the arm 47, lift the governor arm 40 to stop the operation of the turn-table motor and shift the lugs 66 to its uppermost position out of the center of the coin slot so that the machine is ready for the next operation.

It is obvious that numerous changes may be made in the details of structure without departure from the essentials of the invention and that parts may be taken without its adoption in entirety. It is further obvious that means other than the coin-controlled mechanism, could be employed for locking the operating parts and that the locking means could be dispensed with if desired.

Having described my invention, what I claim as new and desire to secure by Letters Patent, is:—

1. In talking machines, the combination with the horizontal turn-table for rotating the record disks and operating mechanism for said turn table, of a movable centering device coöperating with the turn-table to hold the records thereon and means for shifting the records to place between said turn-table and centering device and for removing the same therefrom.

2. In talking machines, the combination with the turn-table for rotating the record disks and operating mechanism for said turn table, of a centering device above the turn-table shiftable to and from the same and arranged to coöperate therewith to hold the record disks in position, shifter mechanism for moving the records to and from said turn-table and means for operating said shifter mechanism and centering device.

3. In a talking machine, the combination with a rotatable record support and a traveling sound box, of a record holder or magazine, manually operable means for moving said record holder or magazine to select a record, shifter mechanism for automatically moving the selected records to and from said holder or magazine and into and out of operative position upon said record support, shifter mechanism for automatically raising and lowering said sound box and moving the same to starting position, driving means for said record support and said shifter mechanisms, means for initiating the operation of said driving means and means for automatically arresting the same.

4. In talking machines, the combination with the reproducer, a turn table for rotating the records and operating mechanism for said turn table, of a record holder or magazine bodily movable to bring any one of the records thereon into line with said turn table, a shifter for moving the records to and from said magazine and into and out of operative position with said turn table, a centering device movable to and from said turn table for positioning and holding the records thereon and means for successively operating said shifter and said centering device.

5. In a talking machine, the combination with a rotatable record support, driving means therefor and a suitable reproducer, of a record holder or magazine, means for shifting said magazine to select a record comprising a rotatable shaft and connections between said shaft and said magazine, shifter mechanism for automatically moving the selected record to and from said magazine and into and out of playing position on said record support, and means automatically controlled by said shifter mechanism for preventing the operation of said magazine shifting means when one of the records is removed therefrom.

6. In a talking machine, the combination with a horizontal turn-table, a sound box laterally movable over said turn-table, and motor mechanism for rotating said turn-table, of a record magazine, a manually operable shaft connected to said magazine for raising and lowering the same to select a record, shifter mechanism for automatically moving the selected record to and from said magazine and into and out of playing position upon said turn-table, a locking wheel upon said shaft and means coöperating with said wheel and controlled by said shifter mechanism for preventing the movement of said shaft when one of the records is removed from said magazine.

be made in the details of structure without departure from the essentials of the invention and that parts may be taken without its adoption in entirety. It is further obvious that means other than the cain-controlled mechanism, could be employed for locking the operating parts and that the locking means could be dispensed with if desired.

7. In talking machines, the combination with a reproducer, turn-table and operating mechanism, of a holder or magazine arranged to support a plurality of disk records on one side of said turn-table, means for shifting said magazine to bring any one of the records thereon in line with said turn-table, a pair of fixed pins arranged to engage central openings in the records and spaced apart at their adjacent ends in the plane of the turn-table and a shifter for moving the record between the ends of the pins onto the turn-table.

8. In talking machines, the combination with a horizontal rotary turn-table, operating mechanism therefor and a suitable reproducer coöperating therewith, of a vertically movable holder or magazine on one side of said turn-table arranged to support a plurality of disk records in horizontal position, a pair of fixed vertical pins arranged to extend through the central openings in said records and spaced apart at their adjacent ends in line with said turn-table, means for vertically shifting said holder or magazine to bring one of the records thereon at the space between the ends of said pins and in line with said turn-table, a horizontally movable shifter for moving the records, so located, from the magazine onto the turntable, a centering device for positioning and holding the record upon the turn-table and mechanism for automatically operating said shifter and centering device.

9. In a talking machine, the combination with a rotatable turn-table for supporting disk records in playing position, and a coöperating sound box, of a record holder or magazine bodily movable to select a record, shifter mechanism for automatically moving the selected record to and from said holder and into and out of playing position upon said turn-table, shifter mechanism for automatically raising and lowering said sound box and for moving the same to starting position, feeding mechanism for automatically shifting said magazine step by step to bring the records thereon successively into coöperative relation with said shifter mechanism, and means extending to the exterior of the machine casing for manually shifting same magazine to select any one of the records thereon.

10. In talking machines, the combination with an inclosing casing, a motor mechanism for rotating the record and a traveling sound box arranged within said casing, and an amplifying horn communicating with said sound box, of a record holder or magazine arranged within said casing, a shifter for moving the records to and from said magazine and into and out of operative relation with said traveling sound box and said motor mechanism, said magazine being bodily movable to bring any one of the records thereon into position to be operated upon by said shifter, and mechanism for automatically and successively moving said shifter and said magazine.

11. In talking machines, the combination with the reproducer, horizontal turn-table and motor mechanism, of a holder or magazine for a plurality of disk records mounted at one side of said turn-table and vertically movable to bring any one of the records thereon in line with said turn-table, a carriage horizontally slidable in line with said turn-table for moving the records to and from said magazine and into and out of position on said turn-table and mechanism for automatically operating said magazine and said carriage.

12. In talking-machines, the combination with the reproducer, turn-table and motor mechanism, of a holder or magazine for disk records vertically movable to bring any one of the records thereon opposite said turn-table, fixed guiding means for preventing the displacement of said records from the magazine, except the record opposite the turn-table and shifter mechanism for automatically moving such record to and from the magazine and into and out of position upon the turn-table.

13. In talking machines, the combination with the reproducer, horizontal turn-table and motor mechanism for the turn-table, of a vertically shiftable holder or magazine for a plurality of disk records at one side of said turn-table, a pair of vertical fixed pins arranged to engage central openings in the disk records on said magazine to prevent the displacement of the records therefrom, but said pins being spaced apart at their adjacent ends to permit removal of the record opposite the turn-table, shifter mechanism for moving such record to and from the magazine and into and out of position upon the turn-table, means for vertically moving said magazine and means for preventing the movement of said magazine when any one of the records is removed therefrom.

14. In talking machines, the combination with the reproducer, horizontal turn-table and motor mechanism, of a holder or magazine for disk records vertically movable to bring any one of the records thereon opposite the turn-table, a shifter for moving such record to and from the magazine and into and out of position upon the turn-table, means for vertically shifting said magazine and mechanism for operating said shifter arranged to lock and unlock the actuating means for said magazine, whereby the movement of the magazine is prevented when one of the records is removed therefrom.

15. In talking machines, the combination with the reproducer, horizontal turn-table and motor mechanism, of a holder or magazine for disk records vertically movable to bring any one of the records thereon opposite the turn-table, a shifter for moving such record to and from the magazine and into and out of operative position upon the turn-table, a lock for holding the magazine against movement, means for operating said shifter and means for moving said magazine and common mechanism for operating the shifter and magazine actuating means and for setting and releasing said lock.

16. In talking machines, the combination with the reproducer, horizontal turn-table and motor mechanism, of a holder or magazine for disk records vertically movable to bring any one of the records thereon opposite the turn-table, a shifter for moving such record to and from the magazine and into and out of operative position upon the turn-table, an operating arm for said shifter, an operating shaft for said magazine, connections between said shaft and said magazine, a ratchet wheel on said shaft and a drive shaft having a crank arm arranged to engage and operate said shifter arm and said ratchet wheel to successively operate said disk shifter and magazine.

17. In talking machines, the combination with the inclosing casing and with the reproducer, turn-table and motor mechanism therein, of a holder or magazine for disk records in said casing vertically movable to bring any one of the records thereon opposite said turn-table, a sliding shifter for moving such record to and from the magazine and into and out of position upon the turn-table, means operable from the exterior of the machine casing for moving said magazine, a lock for said operating means, an actuating arm for said shifter arranged to trip and release said lock and actuating means for said arm.

18. In talking machines, the combination with the inclosing casing and with the reproducer, turn-table and motor mechanism therein, of a holder or magazine for disk records in said casing vertically movable to bring any one of the records thereon opposite said turn-table, a sliding shifter for moving such record to and from the magazine and into and out of position upon the turn-table, a shaft projecting through and operable from the exterior of the machine casing, operating connections between said shaft and said magazine, a ratchet wheel on said shaft, a spring-held locking pawl cooperating with said ratchet, an arm for operating said shifter arranged to trip and release said pawl and mechanism for automatically and successively operating said arm and advancing said shaft and magazine step by step.

19. In talking machines, the combination with the inclosing casing and with the reproducer, turn-table and motor mechanism therein, of a holder or magazine for disk records in said casing vertically movable to bring any one of the records thereon opposite said turn-table, a sliding shifter for moving such record to and from the magazine and into and out of position upon the turn-table, means operable from the exterior of the machine casing for vertically shifting said magazine, a lock for said operating means and mechanism arranged to automatically and successively move said shifter, release said lock and operate said magazine actuating means.

20. In talking machines, the combination with the inclosing casing and with the reproducer, turn-table and motor mechanism therein, of a holder or magazine for disk records in said casing vertically movable to bring any one of the records thereon opposite said turn-table, a sliding shifter for moving such record to and from the magazine and into and out of position upon the turn-table, a shaft operable from the exterior of the machine casing, operating connections between said shaft and said magazine, a ratchet wheel on said shaft, a spring-held locking pawl cooperating with said ratchet wheel, a pivoted arm operatively connected with said shifter having a lug arranged to engage and release said pawl and means for operating said arm.

21. In talking machines, the combination with the inclosing casing and with the reproducer, turn-table and motor mechanism therein, of a holder or magazine for disk records in said casing vertically movable to bring any one of the records thereon opposite said turn-table, a sliding shifter for moving such record to and from the magazine and into and out of position upon the turn-table, a shaft operable from the exterior of the machine casing, operating connections between said shaft and said magazine, a ratchet wheel on said shaft, a spring held locking pawl cooperating with said ratchet, a pivoted arm operatively connected to said shifter and having a lug arranged to engage and trip said locking pawl, and a drive shaft having a crank arm engaging and operating said arm and provided with a toothed end arranged to engage said ratchet wheel to move said shaft and magazine.

22. In talking machines, the combination with the inclosing casing and with the reproducer, turn-table and motor mechanism therein, of a holder or magazine for disk records in said casing vertically movable to bring any one of the records thereon opposite said turn-table, a sliding shifter for moving such record to and from the magazine and into and out of position upon the turn-table, a shaft operable from the exterior of the machine casing, connections between said shaft and said magazine, a ratchet wheel connected with said shaft, a spring held locking pawl cooperating with said ratchet wheel and arranged, in one position, to lock said ratchet and shaft against movement and, in another position, to act as a holder pawl to prevent the movement of said ratchet and shaft in one direction only, and operating means for actuating said shifter and for moving said pawl from one to the other position.

23. In talking machines, the combination with the machine casing and with the horizontal turn-table, reproducer and motor mechanism in said casing, a counter-balanced holder or magazine for disk records in said casing on one side of said turn-table, said magazine being vertically shiftable to bring any one of the records thereon opposite said turn-table, a shifter for moving such record to and from the magazine and into and out of position on the turn-table, a pivoted arm engaging said magazine, a shaft, a heart-shaped cam on said shaft engaging and operating said arm, means for operating said shaft from the exterior of the machine casing, a ratchet wheel connected to said shaft, a locking pawl cooperating with said ratchet and automatic mechanism in the machine casing for operating said disk shifter, tripping said locking pawl and advancing said magazine operating shaft step by step.

24. In talking machines, the combination with the reproducer, horizontal turn-table, and motor mechanism therefor, of a record holder or magazine for supporting a plurality of disk records one above the other, a shifting carriage mounted to slide in the horizontal plane of said turn-table and comprising connected side bars for engaging one of the records on said magazine and moving the same onto said turn-table, means for vertically shifting said magazine to bring any one of the records thereon between the side bars of said shifting carriage mechanism for automatically operating said carriage and means for automatically locking said magazine when one of the records is removed therefrom.

25. In a talking machine, the combination with a horizontal turn-table, an operating motor therefor and a traveling sound box, of a magazine or holder for records vertically shiftable to bring the records thereon adjacent said turn-table, shifter mechanism for automatically moving said records between said magazine and said turn-table, a motor driven shaft, and cam devices connected to said shaft for actuating said shifter mechanism to thereby automatically move the records to and from said magazine and into and out of playing position on said turn-table.

26. In a talking machine, the combination with a horizontal turn-table, an operating motor therefor and a coöperating traveling sound box, of a holder or magazine for a number of disk records vertically shiftable to bring the records thereon adjacent said turn-table, shifter mechanism for moving the records from said magazine and for returning the same thereto, a vertically shiftable centering device coöperating with said turn-table for holding the records thereon, shifter mechanism for raising and lowering the sound box and returning the same to starting position, and means for automatically actuating said centering device and said record and sound box shifter mechanisms.

27. In talking machines, the combination with the reproducer, turn-table and operating motor mechanism, of a magazine or holder for records shiftable to bring any one of the records thereon in line with said turn-table, a shifter for moving the records to and from said magazine and into and out of position on said turn-table, a pivoted arm operatively engaging said shifter, a motor driven shaft and a crank arm on said shaft having a pin engaging a cam slot in said arm.

28. In talking machines, the combination with the reproducer, horizontal turn-table and operating motor, of a holder or magazine for a number of disk records vertically shiftable to bring any one of the records opposite said turn-table, a shifter for moving the records to and from the magazine and into and out of position upon the turn-table, a vertically movable centering device coöperating with the turn-table for positioning and holding the records thereon and mechanism for automatically and successively operating said centering device, said shifter and said magazine.

29. In talking machines, the combination with the reproducer, horizontal turn-table and operating motor, of a holder or magazine for a number of disk records vertically shiftable to bring any one of the records opposite said turn-table, a shifter for moving the records to and from the magazine and into and out of position upon the turn-table, a vertically movable centering device coöperating with the turn-table for positioning and holding the records thereon, a shifter rod whereon said centering device is mounted, a cam for operating said rod to raise and lower said centering device, an operating arm for said record shifter and a drive shaft operatively connected to said arm and to said cam.

30. In talking machines, the combination with the inclosing casing, the traveling sound box and motor mechanism in said casing for rotating the records, and an amplifying horn communicating with said traveling sound box, of shifter mechanism for moving the records into and out of operative relation with said sound box and said motor, shifter mechanism for returning the sound box to initial position, and means operable from the exterior of the machine casing for initiating the operation of said motor and of said shifter mechanism, the shifter mechanism for the sound box being arranged to lower the same into engagement with the record after said motor has started to rotate the record.

31. In talking machines, the combination with the sound box and operating motor, of mechanism for shifting the records into and out of operative relation with said sound box and motor mechanism and for restoring said sound box to initial position, a motor driven shaft for operating said shifter mechanism, means for initiating the operation of said shaft and means controlled by the operation thereof for automatically arresting the same after a movement through a predetermined distance.

32. In talking machines, the combination with the sound box and operating motor, of mechanism for shifting the records into and out of operative relation with said sound box and motor, mechanism for shifting said sound box to initial position, a motor driven shaft for operating said shifter mechanism, means for initiating the operation of said motor and shaft, stop devices for checking the operation of said motor during the operation of said shifter mechanisms and for arresting the movement of said shaft and shifter mechanisms.

33. In talking machines, the combination with the reproducer and operating motor, of shifter mechanism for successively moving the records into and out of operative relation with said reproducer and motor, devices for initiating the operation of said shifter mechanism, means for locking said devices and means for preventing the release of said locking means during the operation of said motor.

34. In talking machines, the combination with the inclosing casing, reproducer and operating motor therein, of shifter mechanism in said casing for moving the records into and out of operative relation with said reproducer and motor, devices for initiating the operation of said shifter mechanism, means for locking said devices, stop devices controlled by said motor for automatically arresting its operation and means controlled by said stop devices for preventing the release of said locking means during the operation of said motor.

35. In talking machines, the combination with the machine casing and the sound box and operating motor therein, of shifter mechanism for moving the records into and out of operative relation with said motor and sound box and for restoring said sound box to initial position, devices operable from the exterior of the machine casing for initiating the operation of said motor and shifter mechanism, and means for preventing the operation of said motor during the operation of said shifter mechanism.

36. In talking machines, the combination with the machine casing and the traveling sound box and operating motor therein, of shifter mechanism for moving the records into and out of operative relation with said motor and traveling sound box, devices operable from the exterior of the machine casing for initiating the operation of said motor and shifting mechanism, a lock for said initiating devices and means controlled by said motor for preventing the release of said lock during the operation of the motor.

37. In talking machines, the combination with the machine casing and the sound box and operating motor therein, of shifter mechanism for moving the records into and out of operative relation with said motor and sound box, mechanism for shifting said sound box to initial position, devices operable from the exterior of the machine casing for initiating the operation of said motor and shifter mechanisms, means for preventing the operation of the motor during the operation of the shifter mechanisms and means for preventing the operation of the shifter mechanisms during the operation of the motor.

38. In talking machines, the combination with the inclosing casing, the traveling sound box and operating motor therein, of shifter mechanism in the casing for moving the records into and out of operative relation with said motor and sound box and for moving said sound box to initial position, an operating spring motor for said shifter mechanism, means operable from the exterior of the machine casing for winding and initiating the operation of said motor and means controlled by said motor for automatically arresting its operation.

39. In talking machines, the combination with the inclosing casing, the reproducer and operating motor therein, of shifter mechanism in the casing for moving the records into and out of operative relation with said motor and reproducer, an operating spring motor for said shifter mechanism, a single means operable from the exterior of the machine casing for both winding and initiating the operation of said motor and means controlled by said shifter actuating motor for preventing the operation of said first mentioned motor during the movement of said shifter mechanism.

40. In talking machines, the combination with the inclosing casing, the reproducer and operating motor therein, of shifter mechanism in the casing for moving the records into and out of operative relation with said motor and reproducer, an operating spring motor for said shifter mechanism, means operable from the exterior of the machine casing for winding and initiating the operation of said motor, a releasable lock for said winding means and devices controlled by said operating motor for preventing the release of said lock until said motor has ceased operation.

41. In talking machines, the combination with the inclosing casing, the reproducer and operating motor therein, of shifter mechanism in the casing for moving the records into and out of operative relation with said motor and reproducer, an operating spring motor for said shifter mechanism, means operable from the exterior of the machine casing for winding and initiating the operation of said motor, a releasable lock for said winding means, stop devices controlled by said operating motor for checking its movement and means controlled by said stop devices for preventing the release of said winding means during the operation of said motor.

42. In talking machines, the combination with the machine casing, and the reproducer and main operating spring motor therein, of shifter mechanism for moving the records into and out of operative relation with said reproducer and said main motor, a supplemental spring motor for actuating said shifter mechanism and a single means operable from the exterior of the machine casing for both simultaneously winding and initiating the operation of both of said motors.

43. In talking machines, the combination with the machine casing and the reproducer and main operating spring motor therein, of shifter mechanism for moving the records into and out of operative relation with said reproducer and said main motor, a supplemental spring motor for actuating said shifter mechanism, means operable from the exterior of the machine casing for simultaneously winding and initiating the operation of both of said motors, a lock for said winding means and means for preventing the release of said lock during the operation of said main operating motor.

44. In talking machines, the combination with the machine casing and the reproducer and main operating spring motor therein, of shifter mechanism for moving the records into and out of operative relation with said reproducer and said main motor, a supplemental spring motor for actuating said shifter mechanism, means operable from the exterior of the machine casing for simultaneously winding said main and supplemental spring motors and for initiating their operation, means controlled by each of said motors for automatically arresting its operation and means controlled by said supplemental motor for preventing the operation of said main motor during the movement of said shifter mechanism.

45. In talking machines, the combination with the inclosing casing, of a shiftable sound box and operating motor for rotating the records mounted within said casing, an amplifying horn communicating with said sound box, a holder or magazine for disk records in said casing, shifter mechanism for moving the records to and from said magazine and into and out of operative relation with said motor mechanism and sound box, means operable from the exterior of the casing for moving said magazine to bring any selected record therein into operative relation with said shifter mechanism and means interposed between said motor mechanism and said shifter mechanism for preventing the operation of the latter during the operation of said motor mechanism.

46. In talking machines, the combination with the inclosing casing, of a shiftable sound box, turn table and operating motor for rotating the records within said casing, an amplifying horn communicating with said sound box, a holder or magazine for disk records in said casing, shifter mechanism for moving the records between said magazine and said turn table, devices operable from the exterior of the machine casing for initiating the operation of said shifter mechanism and motor, a releasable lock for said initiating devices and means controlled by the operation of said motor for preventing the release of said lock during the operation of said turn table.

47. In talking machines, the combination with the machine casing, the reproducer, turn-table and operating motor for the turn-table in said casing, of a holder or magazine for disk records in said casing, a shifter for moving the records between said magazine and turn-table, means operable from the exterior of the machine casing for simultaneously initiating the operation of said turn-table, motor and said shifter mechanism and means for checking the operation of said turn-table during the operation of said shifter mechanism.

48. In talking machines, the combination with the machine casing, the sound box, turn-table and operating motor for the turn-table in said casing, of a holder or magazine for disk records in said casing, a shifter mechanism for moving the records between said magazine and said turn-table and for moving said sound box to initial position, a spring motor for operating said shifter mechanism, means operable from the exterior of the machine casing for winding and initiating the operation of said spring motor, stop devices controlled by said spring motor for automatically arresting its operation and means controlled by said stop devices for preventing the operation of said turn-table during the movement of said shifter mechanism.

49. In talking machines, the combination with the machine casing, the reproducer, turn-table and operating motor for the turn-table in said casing, of a holder or magazine for disk records in said casing, a shifter for moving the records between said magazine and said turn-table, a spring motor for operating said shifter mechanism, devices operable from the exterior of the machine casing for winding and initiating the operation of said spring motor, a releasable lock for said winding devices and means controlled by said turn-table motor for preventing the release of said lock during the operation of said turn-table.

50. In talking machines, the combination with the machine casing, of a reproducer and motor mechanism in said casing, a bodily movable record magazine, mechanism for automatically shifting said magazine, changing the record, restoring said reproducer and changing the reproducer stylus at each successive operation of the machine.

51. In talking machines, the combination with the reproducer and motor mechanism, of a record magazine bodily movable to bring the records thereon opposite said reproducer and motor mechanism, a needle magazine and mechanism for automatically shifting the record from said magazine to said motor mechanism and providing said reproducer with a needle from said needle magazine at each successive operation of the machine.

52. In talking machines, the combination with the inclosing casing, the traveling sound box, turn table and motor mechanism for rotating said turn table arranged in said casing, and an amplifying horn communicating with said sound box, of a magazine for holding records in said casing, means for bodily shifting said magazine to bring any record thereon in line with said turn table, a shifter for moving records between said magazine and said table, a needle magazine, a shifter for projecting needles therefrom to said sound box, a shifter for restoring said sound box to initial position, and mechanism for automatically and successively operating said shifters.

53. In talking machines, the combination with the operating motor, of shifter mechanism for moving the records into and out of operative relation with said motor, a reproducer having needle-clamping means, cam devices for operating said needle-clamping means, a shifter for moving said reproducer into operative relation with said cam devices, a needle magazine and means operated by said shifter for projecting a needle from said magazine to the clamping means of said reproducer.

54. In talking machines, the combination with the horizontal turn-table and its motor mechanism, of shifter mechanism for moving disk records into and out of operative position upon said turn-table, a coöperating reproducer having a needle holder provided with a spring-held needle clamp, fixed cam devices controlling the movement of said reproducer and the operation of said needle-clamp, a second shifter mechanism for moving said reproducer into operative relation with said cam devices, a needle magazine, means operated by said shifter mechanism for projecting the needle therefrom, said reproducer having means for guiding the needle from the magazine to the needle holder thereof and means for automatically operating said record shifter mechanism and said reproducer shifter mechanism.

55. In talking machines, the combination with the turn-table and its motor mechanism, of shifter mechanism for moving disk records into and out of operative position upon said turn-table, a centering device coöperating with said turn-table to position and hold the records thereon, a shifter rod whereon said centering device is mounted, a reproducer arm mounted to shift horizontally and vertically, a reproducer carried by said arm and means operated by said shifter rod for restoring said arm and reproducer.

56. In talking machines, the combination with the turn-table and its motor mechanism, of shifter mechanism for moving disk records into and out of operative position upon said turn-table, a centering device coöperating with said turn-table to position and hold the records thereon, a shifter rod whereon said centering device is mounted, a reproducer arm mounted to shift horizontally and vertically, a reproducer carried by said arm and a rail pivoted at one end to the machine frame and at its other end to said shifter rod, said rail extending beneath said reproducer arm and arranged, when moved by said shifter rod, to restore said arm and reproducer.

57. In talking machines, the combination with the turn-table and its motor mechanism, of shifter mechanism for moving disk records, a centering device coöperating with said turn-table to position and hold the records thereon, a shifter rod whereon said centering device is mounted, a reproducer arm mounted to shift horizontally and vertically, a reproducer on said arm having a spring-held needle clamp, means operated by said shifter rod for elevating and restoring said arm and reproducer, cam devices for controlling the vertical shift of said reproducer and for tripping said needle clamp, a needle magazine and means operated by said shifter rod for projecting the needle therefrom, said reproducer having means for guiding the needle from the magazine to its needle clamp.

58. In talking machines, the combination with the inclosing casing, of a turn-table and motor mechanism in said casing, shifter mechanism for moving disk records into and out of operative position upon said turn-table, a reproducer arm mounted to shift horizontally and vertically, a second shifter mechanism for elevating and restoring said reproducer arm, a reproducer on said arm having needle-clamping means, a needle magazine, devices coöperating with said second shifter mechanism for tripping said clamping means to release the old needle and for projecting a new needle from said magazine to said clamping means and devices for operating both of said shifter mechanisms.

59. In talking machines, the combination with the operating motor, of a reproducer coöperating therewith having releasable needle-clamping means, means for shifting and restoring said reproducer, a fixed cam for engaging and tripping said needle-clamping means to release the used needle, a fixed stop or abutment for holding the new needle in position within said clamp, a second fixed cam controlling the shift of said reproducer and for guiding said needle-clamping means into operative relation with said releasing cam and said stop or abutment, a needle magazine and means for projecting a needle therefrom to the needle-clamping means of said reproducer.

60. In talking machines, the combination with the turn-table and its operating motor, of a reproducer arm mounted to shift both horizontally and vertically, a reproducer mounted on said arm having a needle holder provided with a releasable clamp, means for shifting and restoring said arm and reproducer, a fixed cam for tripping said clamp to release the used needle, a fixed stop or abutment for arresting the new needle in position within said holder, an auxiliary fixed cam controlling the shift of said reproducer and guiding said clamp and needle holder into operative relation with said tripping cam and said stop or abutment, a needle magazine and devices operated by the reproducer shifting and restoring means to project a new needle therefrom, said reproducer having means for guiding a needle from said magazine to the needle holder thereof.

61. In a talking machine, the combination with a turn-table for rotating disk records, of a traveling sound box having a releasable needle clamp and a needle guide passage leading to said clamp, a needle magazine rotatably mounted upon the machine frame above one end of the path of movement of said sound box, said rotatable magazine comprising a circular series of vertical needle-holding tubes, a fixed plate below said magazine having an opening therein, means operable to release said needle clamp when said sound box is in position below said magazine and means for rotating said magazine step by step to bring said tubes in line with said opening to discharge the needle therethrough and into the needle guide of said reproducer.

62. In talking machines, the combination with the operating motor, of a reproducer coöperating therewith having a releasable needle clamp and a needle guide passage leading thereto, means for releasing said clamp to discharge the used needle, a rotary needle magazine in position above said reproducer when at one end of its movement, said magazine comprising a series of vertical needle-holding tubes, a fixed plate below said magazine having an opening therein, each of said tubes being arranged to support a number of needles arranged end to end, one above the other, means for rotating said magazine step by step to bring said tubes successively in line with the opening in said plate and with the needle guide of said reproducer and means for preventing the discharge of but one needle from any of the tubes of said magazine when in line with the opening of said plate.

63. In talking machines, the combination with the turn-table and its operating motor, of a reproducer arm arranged to shift horizontally and vertically, a reproducer mounted on said arm having a releasable needle clamp, mechanism for discharging the old needle and placing a new needle in said clamp and a record driven by said motor having a record groove for engaging and propelling the needle of said reproducer and a groove leading from the record groove for guiding said reproducer into operative relation with said needle changing mechanism.

64. In talking machines, the combination with the turn-table and its motor mechanism, of a reproducer arm mounted to shift horizontally and vertically, a reproducer on said arm having a suitable needle holder and needle, shifter mechanism for restoring said arm and reproducer, means coöperating with said shifter mechanism for changing the needle in the holder of said reproducer and a record on said turn-table having a sound groove for engaging the needle of the reproducer and propelling the same, said record having a groove leading from the sound groove thereof for guiding the reproducer into operative relation with said needle changing means.

65. In talking machines, the combination with the machine casing, of an operating motor for rotating disk records in said casing, a sound box having a stylus for engaging the records, a shifter mechanism for moving the records into and out of operative relation with said sound box and said motor, a second shifter mechanism for shifting said sound box and for changing the stylus thereof, a supplemental motor for operating said shifter mechanisms, means for initiating the operation of said motors, and means for automatically and successively arresting the movement of said supplemental motor and said main operating motor, substantially as described.

66. In talking machines, the combination with the machine casing, of an operating motor in said casing, a reproducer, shifter mechanism for moving the records into and out of operative relation with said motor mechanism and reproducer and for restoring said reproducer, an operating spring motor for said shifter mechanism, means operable from the exterior of the machine casing for winding and initiating the operation of said motor and a releasable lock for said winding means.

67. In talking machines, the combination with the machine casing, of an operating motor in said casing, a reproducer, shifter mechanism for moving the records into and out of operative relation with said motor mechanism and reproducer and for restoring said reproducer, an operating spring motor for said shifter mechanism, means operable from the exterior of the machine casing for winding and initiating the operation of said motor, a lock for said winding means, means for releasing said lock and devices for preventing the operation of said releasing means during the reproduction of a record.

68. In talking machines, the combination with a turn-table and its operating motor, of a reproducer arm mounted to shift horizontally and vertically, a reproducer carried on said arm, shifter mechanism for elevating and restoring said arm, a needle magazine and mechanism coöperating with said reproducer and said magazine for discharging the used needle and placing a new one in said reproducer.

69. In talking machines, the combination with the machine casing, of a turn-table in said casing, an operating spring motor therefor, a record magazine, a shifter for moving the records between said magazine and said turn-table, a reproducer coöperating with the record on said turn-table, a second shifter for elevating and restoring said reproducer, means coöperating with said reproducer and its shifter for changing the needle of said reproducer, an auxiliary spring motor to operate said record shifter and said reproducer shifter, means operable from the exterior of the machine casing for winding and initiating the operation of said turn-table motor and said auxiliary shifter motor and means for preventing the operation of said turn-table motor during the movement of said auxiliary shifter motor.

70. In talking machines, the combination with the machine casing, of a turn-table in said casing, an operating spring motor therefor, a record magazine, a shifter for moving the records between said magazine and said turn-table, a reproducer coöperating with the record on said turn-table, a second shifter for elevating and restoring said reproducer, means coöperating with said reproducer and its shifter for changing the needle of said reproducer, a second spring motor to operate said record shifter and said reproducer shifter, means operable from the exterior of the machine casing for winding and initiating the operation of said turn-table motor and said shifter motor, a releasable lock for said winding means and means for preventing the release of said lock during the operation of said motors.

71. In talking machines, the combination with the machine casing, of a turn-table in said casing, an operating spring motor therefor, a record magazine, a shifter for moving the records between said magazine and said turn-table, a reproducer coöperating with the record on said turn-table, a second shifter for elevating and restoring said reproducer, means coöperating with said reproducer and its shifter for changing the needle of said reproducer, a second spring motor to operate said record shifter and said reproducer shifter, means operable from the exterior of the machine casing for winding and initiating the operation of said turn-table motor and said shifter motor, stop devices controlled by each of said motors for arresting the movement thereof and devices for preventing the operation of said winding means during the operation of said motors.

72. In a talking machine, the combination with a turn-table for disk-records, driving mechanism for said turn-table, a hollow reproducer arm mounted to shift both horizontally and vertically, a sound box on said arm adapted to coöperate with the record on said turn-table, an amplifying horn communicating with said arm, shifter mechanism for automatically moving records into and out of operative position upon said turn-table, manually operable means for shifting a selected record into operable position with said shifter mechanism, and shifter mechanism for automatically raising and lowering said arm and moving the same to starting position.

73. In talking machines, the combination with the machine casing, of a turn-table and its motor in said casing, shifter mechanism for moving records into and out of operative relation on said turn-table, a centering device coöperating with said turn-table to position and hold the records thereon and an amplifying horn projecting through said casing, a hollow reproducer arm mounted to swing horizontally and vertically at the inner end of said horn, a reproducer mounted upon said arm and free to engage and be propelled by the record on said turn-table and a shifter for lifting and restoring said arm.

74. In talking machines, the combination with the machine casing, of a horizontal turn-table and its motor mechanism in said casing, an amplifying horn projecting from said casing, a hollow reproducer arm mounted upon the inner end of said horn to swing horizontally and vertically, a reproducer carried on said arm and free to engage and be propelled by the record on said turn-table, means for initiating the operation of said motor, stop devices controlled by said motor for automatically arresting its operation, a shifter for lifting and restoring said arm and reproducer, a needle magazine, means for supplying the reproducer with fresh needles from said magazine and mechanism for operating said shifter and said needle changing means.

75. In talking machines, the combination with the turn-table and reproducer, of a pair of holders or magazines for disk records on opposite sides of said turn-table, means for vertically moving said magazines to bring the records thereon opposite said turn-table, and a horizontally sliding shifter for moving the record on the turn-table into one of the magazines and for simultaneously placing a new record thereon from the other of said magazines.

76. In talking machines, the combination with the horizontal turn-table, its motor mechanism and reproducer, of a pair of vertically movable holders or magazines for disk records on opposite sides of said turn-table, a horizontally sliding shifter for alternately moving the records to and from said magazines and into and out of operative position on said turn-table and mechanism for operating said shifter and for vertically moving said magazines.

77. In talking machines, the combination with the machine casing, of a turn-table, its motor mechanism and a coöperating reproducer in said casing, a pair of holders or magazines for disk records in said casing on opposite sides of said turn-table, mechanism operable from the exterior of the machine casing for vertically shifting said magazines to bring any one of the records thereon opposite said turn-table, shifter mechanism for alternately moving the records to and from said magazines and into and out of operative position upon the turn-table and means for locking either of said magazines when one of the records is removed therefrom.

78. In talking machines, the combination with the machine casing, of a turn-table, its motor mechanism and a coöperating reproducer in said casing, a pair of holders or magazines for disk records in said casing on opposite sides of said turn-table, mechanism operable from the exterior of the machine casing for vertically shifting said magazines to bring any one of the records thereon opposite said turn-table, shifter mechanism for alternately moving the records to and from said magazines and into and out of operative position upon the turn-table, locking devices for said magazines and operating mechanism for said shifter arranged to alternately release the locking devices of the separate magazines.

79. In talking machines, the combination with mechanism for rotating the records, a sound box having a needle for engaging the records and an amplifying device communicating with said sound box, of a record holder or magazine, shifter mechanism for automatically having the records to and from said magazine and into and out of operative relation with said rotating mechanism and said sound box, means for moving said magazine to bring any one of the records thereon into engagement with said shifter mechanism, and means for rendering said moving means inoperative when one of the records is removed therefrom.

80. In talking machines, the combination with a horizontal turn-table and motor mechanism for rotating disk records, a sound box having a needle for engaging the records, said sound box being movable over the turn-table, and an amplifying device communicating with said sound box, of a holder or magazine for disk records on one side of said turn-table, shifter mechanism for automatically moving any one of the records in said magazine to and from the turn-table, said magazine being vertically movable to bring any one of the records thereon into engagement with said shifter mechanism, and fixed means for preventing the displacement of any of the records from the magazine except the record in engagement with said shifter mechanism.

81. In talking machines, the combination with a horizontal turn-table and motor mechanism for rotating disk records, of a sound box movable over said turn-table and having a needle for engaging the record, and an amplifying device communicating with said sound box, of a magazine for holding disk records one above the other on one side of said turn-table, shifter mechanism for automatically moving the records to and from the magazine and into and out of position upon the turn-table, means for vertically moving said magazine to bring any one of the records thereon into engagement with said shifter mechanism, devices for preventing the operation of said moving means when a record is removed from said magazine, and means for preventing the displacement of any of the records from the magazine, except the record in engagement with said shifter mechanism.

82. In talking machines, the combination with the inclosing casing, of a turn-table and motor mechanism therein for rotating disk records, a sound box movable over the turn-table and having a needle for engaging the records, and an amplifying device communicating with said sound box, a magazine for holding disk records one above the other on one side of said turn-table, a horizontally movable shifter for automatically moving the records to and from the magazine and into and out of position upon the turn-table, means operable on the exterior of the casing for vertically moving the magazine to bring any one of the records thereon into engagement with said shifter, and devices controlled by the operation of said shifter for rendering the said moving means inoperative when one of the records is removed from the magazine.

83. In talking machines, the combination with the inclosing casing, of a turn-table and motor mechanism therein for rotating disk records, a sound box movable over the turn-table and having a needle for engaging the records, an amplifying device communicating with said sound box, a magazine for holding disk records one above the other on one side of said turn-table, a horizontally movable shifter for moving the records to and from the magazine and into and out of position upon the turn-table, means operable on the exterior of the casing for vertically moving the magazine to bring any one of the records thereon into engagement with said shifter, devices controlled by the movement of said shifter for preventing the operation of said magazine moving means when a record is removed therefrom, means for preventing the displacement of any of the records from the magazine except the record in engagement with said shifter and mechanism for automatically operating said shifter and for initiating the operation of said turn-table and sound box.

84. In talking machines, the combination with a casing, of a turn-table and motor mechanism in said casing for rotating disk records, a sound box movable over said turn-table and having a needle for engaging the records thereon, and an amplifying device opening outside of said casing and communicating with said sound box, a magazine for holding disk records one above the other at one side of said turn-table, a shifter for moving the records to and from said magazine and into and out of position upon said turn-table, means operable from the exterior of the casing for vertically moving said magazine to bring any one of the records thereon into engagement with said shifter, mechanism for automatically operating said shifter and for initiating the operation of said turn-table and said sound box and means controlled by said mechanism for rendering said magazine moving means inoperative when a record is removed from the magazine.

85. In talking machines, the combination with a horizontal turn-table and motor mechanism for rotating disk records, a sound box movable over the said turn-table and carrying a needle for engaging the records, and amplifying means communicating with said sound box, of a holder or magazine for supporting a plurality of disk records one above the other arranged at one side of said turn-table, means for vertically moving said magazine to bring any one of the records thereon into line with said turn-table, a carriage horizontally slidable in line with said turn-table for moving the records to and from said magazine and into and out of position on said turn-table, fixed guides for said carriage and mechanism for automatically shifting said carriage in opposite directions.

86. A talking machine comprising a support for talking machine records, actuating means therefor, a magazine for holding talking machine records, auxiliary actuating means, and means actuated by said auxiliary means for moving a talking machine record from said magazine to said support and for returning said record from said support directly to its original position in said magazine.

87. In a talking machine, a turntable, a movable sound reproducer, means for successively placing the records on, and removing the same from said turntable, means for withdrawing said sound reproducer from the records, returning the same to the starting position and for placing said sound reproducer mechanism in contact with said record, said means comprising an inclined support, along which said sound reproducer mechanism is adapted to slide, and means for raising and lowering said support, and connections between said means for placing the records upon the turntable and said support.

88. In a talking machine, sound reproducing mechanism, means for automatically operating said reproducing mechanism in relation to the record, comprising an inclined arm, a vertically reciprocating rod for raising the said arm to withdraw said reproducing mechanism from the record and to allow said reproducing mechanism to traverse the said arm in a downward direction, and for lowering said arm to allow said reproducing mechanism to engage the record.

89. In a talking machine, a turntable, means for automatically supplying records to said turntable and removing the same therefrom, comprising a record carrier, a vertically reciprocatory receptacle having a series of compartments or divisions for the records and means for moving said receptacle to bring each division successively opposite the record carrier.

90. In a talking machine, the combination with a record support for talking machine records, of a magazine for holding talking machine records, means for transferring records from said magazine to said support, a motor for actuating said support and an auxiliary motor for actuating said record transferring means.

91. In a talking machine, the combination with a rotatable record support and a reproducer coöperating therewith, of a record magazine bodily shiftable to bring the records thereon adjacent said record support, record shifter mechanism, means for automatically actuating said record shifter mechanism to move records to and from said magazine, means for disengaging the shifted record from said shifter mechanism, and mechanism for automatically raising the reproducer and for shifting the same to start- 92. In a talking machine, the combination with a turn-table for rotating disk records, and a sound box coöperating therewith, of a record magazine vertically shiftable to bring the records thereon adjacent said turn-table, shifter mechanism for moving records to and from said magazine, means for disengaging the shifted record from said mechanism and for positioning the same upon said turn-table, a shifter mechanism for raising and lowering the sound box and for moving the same to starting position in relation to the record on the turn-table, and means for automatically actuating said record and sound box shifter mechanisms and said record disengaging means.

93. In a talking machine, the combination with a horizontal turn-table for rotating disk records and a coöperating sound box, of a record magazine vertically movable to bring the records thereon adjacent said turn-table, shifter mechanism for moving records to and from said magazine and into and out of operative position upon said turn-table, shifter mechanism for moving said magazine step by step to bring the records thereon into engagement with said record shifter mechanism, and means for automatically actuating said magazine and record shifter mechanisms.

94. In a talking machine, the combination with a rotatable record support and a coöperating reproducer, of a record magazine bodily shiftable to bring any record thereon adjacent said support, shifter mechanism for automatically moving the records to and from said magazine and into and out of operative position upon said record support and for shifting said reproducer to starting position, manually operable devices for initiating the operation of said turn-table and said shifter mechanism and means controlled by the operation of said turn-table for preventing the operation of said initiating devices during the reproduction of a record.

95. In a talking machine, the combination with a horizontal turn-table and traveling sound box coöperating therewith, of a record magazine vertically shiftable to bring the records thereon adjacent said turn-table, shifter mechanism for automatically moving the records to and from said magazine and into and out of operative position upon said turn-table, shifter mechanism for automatically raising and lowering said sound box and for moving the same to starting position, manually operable devices for initiating the operation of said turn-table and said automatic shifter mechanisms, automatic stop devices for arresting the operation of said shifter mechanisms and said turn-table, and means controlled by the operation of said turn-table for preventing the operation of said shifter mechanisms during the reproduction of a record.

96. In a talking machine, the combination with a rotatable record support of a coöperating sound box, a horizontally and vertically movable supporting arm for said sound box, a record magazine bodily movable to bring the records therein adjacent said support, a needle magazine, shifter mechanism for automatically moving the records between said record magazine and said support, shifter mechanism for automatically raising and lowering said reproducer and moving the same to starting position, shifter mechanism for automatically providing the reproducer with a new needle from said needle magazine, and means for actuating said automatic shifter mechanisms at each operation of the machine.

97. In a talking machine, the combination of a turn-table for rotating disk records and a coöperating sound box, of shifter mechanism for automatically moving the records to and from said turn-table, means coöperating with said turn-table for disengaging the shifted record from said shifter mechanism, and a second shifter mechanism for automatically raising and lowering said sound box, for returning the same to starting position and changing the reproducing needle thereof.

98. In a talking machine, the combination of a rotatable record support and a coöperating reproducer, a record magazine, means for shifting said magazine to bring the records thereon adjacent said support, shifter mechanism for automatically moving the records to and from said magazine and into and out of operative position upon said support, a second shifter mechanism for raising and lowering said reproducer and moving the same to starting position, manually operable means for initiating the operation of said support and said shifter mechanisms and means for automatically and successively arresting said shifter mechanisms and said support.

99. In a talking machine the combination with a rotatable record support and a coöperating reproducer, of two record magazines, shifter mechanism for moving a record from said turn-table to one of said magazines and for moving a new record in the other of said magazines to said turn-table, and a shifter mechanism for raising and lowering said reproducer and moving it to starting position.

100. In a talking machine, the combination with a rotatable record support and a coöperating reproducer, of a pair of record magazines, shifter mechanism for moving a record from said turn-table to one of said magazines and for moving a new record from the other of said magazines to said turn-table, shifter mechanism for raising and lowering said reproducer and moving the same to starting position, actuating means for said turn-table and said shifter mechanisms, means for initiating the operation of said actuating means, and devices for automatically stopping said actuating means at the end of the reproduction of a record.

101. In a talking machine, the combination with a turn-table for disk records and a coöperating sound box, of a pair of magazines shiftable to bring the records thereon adjacent said turn-table, a shifter mechanism for moving a record from said turn-table to one of said magazines and for shifting a new record from the other of said magazines to said turn-table, shifter mechanism for raising and lowering said sound box and for moving the same to starting position, actuating means for said turn-table and for said shifter mechanisms, and means for automatically stopping said actuating means at the end of the reproduction of a record with the record in place upon said turn-table.

102. In a talking machine, the combination with a rotatable record support and a coöperating reproducer, of a record magazine, means for automatically shifting records between said magazine and said support, means for automatically moving said sound box to starting position, a motor for actuating said support and an auxiliary motor for actuating said record and said sound box shifting means.

103. In a talking machine, the combination with a rotatable record support and a coöperating reproducer, of a record magazine shiftable to select any one of the records therein, and means for automatically moving the selected record from said magazine to said support and for automatically shifting said sound box to starting position.

104. In a multiple record talking machine, the combination with a rotatable record support and a coöperating reproducer, of a magazine, shifter mechanism for automatically shifting a record from said magazine to said support and back to said magazine, and means for moving said magazine relatively to said shifter mechanism.

105. In a multiple record talking machine, the combination with a rotatable record support and a coöperating reproducer, of a record magazine, means for automatically advancing said magazine as a whole to bring successive records adjacent said record support, and means for shifting a record from said magazine into playing position upon said support.

106. In a multiple record talking machine, the combination with a rotatable record support and a coöperating reproducer, of a record magazine, means for automatically advancing said magazine as a whole to bring successive records therein adjacent said record support, and means for automatically shifting a record from said magazine to said support and for automatically moving said reproducer to starting position.

107. In a talking machine, the combination with a rotatable record support and a coöperating sound box, of mechanism for placing a record on or moving it from said support, a vertically movable guide for said sound box, and means for automatically shifting said guide to raise and lower said sound box to permit the changing of records upon said support, said sound box being arranged to shift laterally along said guide back to starting position.

108. In a talking machine, the combination with a horizontal turn-table of a coöperating sound box, a horizontally and vertically movable supporting arm whereon said sound box is mounted, shifter mechanism for automatically moving records into and out of playing position upon said turn-table, a vertically movable guide for said sound box arm, and means for automatically shifting said guide to raise and lower said sound box, to permit the interchange of records upon said turn-table, said sound box being arranged to move along said guide back to starting position.

109. In a talking machine, the combination with a rotatable record support, and a coöperating reproducer, of a magazine, a plurality of records therein, means for shifting said magazine back and forth to bring the records adjacent said support, shifter mechanism for automatically moving the records to and from said support and for automatically shifting said reproducer to starting position, means for disengaging the shifted record from said shifter mechanism, and means for preventing the movement of said magazine, when a record is removed therefrom.

110. In a talking machine, the combination with a rotatable record support, and a coöperating reproducer, of a record magazine, a rotatable shaft connected to said magazine for shifting the same back and forth to select a record, and shifter mechanism for automatically moving the selected record to and from said support and for automatically moving said reproducer to starting position.

111. In a talking machine, the combination with a rotatable record support and a coöperating reproducer, of a record magazine, a rotatable shaft, a stepped heart-shaped cam on said shaft connected to said magazine to shift the same back and forth step-by-step to select a record, and means for shifting the selected record to and from said support and for moving said reproducer to starting position.

112. In a talking machine, the combination with a turn-table for rotating disk records and a coöperating sound box, of a record magazine, means for shifting the same back and forth to select a record, a needle magazine, and automatic shifter mechanism for moving the selected record to said turn-table, changing the needle of said sound box and moving the latter to starting position.

JOHN GABEL.

Witnesses:
 HARRY L. CLAPP,
 KATHARINE GERLACH.

Corrections in Letters Patent No. 1,134,603.

It is hereby certified that in Letters Patent No. 1,134,603, granted April 6, 1915, upon the application of John Gabel, of Chicago, Illinois, for an improvement in "Automatic Talking-Machines," errors appear in the printed specification requiring correction as follows: Page 4, line 82, for the word "possible" read *impossible;* page 11, line 80, for the word "are" read *the;* page 12, strike out lines 92 to 100, inclusive; and that the said Letters Patent should be read with these corrections therein that the same may conform to the record of the case in the Patent Office.

Signed and sealed this 27th day of April, A. D., 1915.

[SEAL.]

J. T. NEWTON,
*Acting Commissioner of Patents.*